United States Patent
Mohri et al.

(10) Patent No.: US 8,043,753 B2
(45) Date of Patent: Oct. 25, 2011

(54) METHOD OF OPERATING A SOLID POLYMER ELECTROLYTE FUEL CELL AND AGING APPARATUS

(75) Inventors: Masahiro Mohri, Utsunomiya (JP); Norimasa Kawagoe, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 244 days.

(21) Appl. No.: 12/258,070

(22) Filed: Oct. 24, 2008

(65) Prior Publication Data

US 2009/0110969 A1    Apr. 30, 2009

(30) Foreign Application Priority Data

Oct. 24, 2007  (JP) ................................. 2007-276296
Oct. 24, 2007  (JP) ................................. 2007-276297
Oct. 24, 2007  (JP) ................................. 2007-276298
Oct. 24, 2007  (JP) ................................. 2007-276299

(51) Int. Cl.
*H01M 8/04* (2006.01)
*H01M 8/10* (2006.01)
*H01M 8/00* (2006.01)

(52) U.S. Cl. ........ 429/429; 429/483; 429/491; 429/505; 429/413; 429/535

(58) Field of Classification Search .................. 429/410, 429/428, 429, 505, 483, 491
See application file for complete search history.

(56) References Cited

U.S. PATENT DOCUMENTS

| | | | | |
|---|---|---|---|---|
| 5,441,821 A | * | 8/1995 | Merritt et al. ................. | 429/410 |
| 2005/0282049 A1 | * | 12/2005 | Sasaoka et al. ................. | 429/13 |
| 2006/0183007 A1 | * | 8/2006 | Fukumoto et al. .............. | 429/13 |
| 2007/0238001 A1 | * | 10/2007 | Koyama ......................... | 429/33 |

FOREIGN PATENT DOCUMENTS

| | | |
|---|---|---|
| JP | 2003-217622 | 7/2003 |
| JP | 2005-251396 | 9/2005 |
| JP | 2005-302360 | 10/2005 |
| JP | 2006-40869 | 2/2006 |
| JP | 2007-66666 | 3/2007 |

* cited by examiner

*Primary Examiner* — Jonathan Crepeau
*Assistant Examiner* — Kenneth Douyette
(74) *Attorney, Agent, or Firm* — Nelson Mullins Riley & Scarborough LLP; Anthony A. Laurentano

(57) ABSTRACT

In a first aging step, a plus electrode electric potential is applied to an anode of a fuel cell, and a minus electrode electric potential is applied to a cathode of the fuel cell. In this state, hydrogen pump operation is performed at maximum current density in use by supplying humidified hydrogen to the anode without supplying any oxygen-containing gas to the cathode. Thus, the hydrogen passes through a solid polymer electrolyte membrane toward the cathode. After the first aging step, in a second aging step, power generation of the fuel cell is performed at the maximum current density.

18 Claims, 21 Drawing Sheets

METHOD OF OPERATING A SOLID POLYMER ELECTROLYTE FUEL CELL AND AGING APPARATUS

BACKGROUND OF THE INVENTION

1. Field of the Invention

The present invention relates to a method of operating a solid polymer electrolyte fuel cell for aging of the solid polymer electrolyte fuel cell. The solid polymer electrolyte fuel cell includes a membrane electrode assembly comprising a pair of electrodes and an electrolyte membrane interposed between the electrodes. Further, the present invention relates to an aging apparatus for aging of such a solid polymer electrolyte fuel cell.

2. Description of the Related Art

Fuel cells are systems for obtaining direct current electrical energy by supplying a fuel gas (chiefly containing hydrogen) and an oxygen-containing gas (chiefly containing oxygen) to an anode and a cathode for inducing electrochemical reactions at the anode and the cathode.

For example, a solid polymer electrolyte fuel cell includes a power generation cell formed by sandwiching a membrane electrode assembly between separators. The membrane electrode assembly includes the anode, and the cathode, and an electrolyte membrane interposed between the anode and the cathode. The electrolyte membrane is a solid polymer ion exchange membrane. In use of this type of the power generation cell, generally, predetermined numbers of the membrane electrode assemblies and separators are stacked together to form a fuel cell stack.

In the solid polymer electrolyte fuel cell of this type, since the amount of water contained in the newly-assembled electrolyte membrane is not sufficient, the initial power generation performance is low. Therefore, in general, in order to achieve the desired power generation performance, aging operation for the fuel cell is performed after the fuel cell has been assembled.

For example, in a method of operating a fuel cell disclosed in Japanese Laid-Open Patent Publication No. 2003-217622, in order to cause flooding in the unit cells of the fuel cell at the time of preliminary operation (aging operation) of the fuel cell, the gas utilization ratio of the consumed gas is improved.

However, in the above operating method, since flooding is induced quickly, the control for suppressing degradation in the cell performance is complicated. In particular, the performance of the electrolyte membrane of the MEA may be affected undesirably.

In the case of, e.g., using hydrocarbon material instead of fluorine material for the electrolyte membrane of the MEA, since the hydrocarbon material is hydrophobic in comparison with the fluorine material, it takes a considerable time to impregnate the electrolyte membrane with water.

In an attempt to address the problem, Japanese Laid-Open Patent Publication No. 2007-066666 discloses an aging apparatus for a solid polymer electrolyte fuel cell, and the aging apparatus includes a load consuming load current from the solid polymer electrolyte fuel cell at the time of preliminary operation, and control means connected between the solid polymer electrolyte fuel cell and the load for changing the magnitude of the load current cyclically over time.

According to the disclosure, in the structure, since the magnitude of the load current is changed cyclically over time, water impregnation in the MEA is facilitated, and reduction in the time required for aging operation is achieved.

In Japanese Laid-Open Patent Publication No. 2007-066666, the aging operation is started by supplying a cathode gas to the cathode, supplying an anode gas to the anode, and applying load current from the fuel cell stack to the load such that the magnitude of the load current is changed cyclically over time.

However, when the MEA is used for the first time after it is assembled, power generation cannot be performed at high current density. Therefore, operation of gradually increasing the amount of the applied electrical current from low current density, and operation of reducing the holding time during applying the electrical current to the load and returning the applied voltage to OCV (open circuit voltage) are required.

Under the circumstances, it takes considerable time to achieve the maximum power generation performance of the fuel cell, and such an aging operation is time consuming. Further, since the cathode gas and the anode gas are consumed in the aging operation, in particular, the amount of hydrogen consumption is excessively large. Therefore, the aging operation is extremely uneconomical.

SUMMARY OF THE INVENTION

A main object of the present invention is to provide a method of operating a solid polymer electrolyte fuel cell and an aging apparatus which make it possible to reduce the time required for an aging process, prevent consumption of hydrogen as much as possible, and perform the aging process economically.

The present invention relates to a method of operating a solid polymer electrolyte fuel cell for aging of the solid polymer electrolyte fuel cell. The solid polymer electrolyte fuel cell includes a membrane electrode assembly comprising a pair of electrodes and an electrolyte membrane interposed between the electrodes.

The operating method includes a first aging step and a second aging step. In the first aging step, hydrogen pump operation is performed at least at maximum current density in use in a state where an electric potential is applied to the solid polymer electrolyte fuel cell, by not supplying an oxygen-containing gas to one of the electrodes and by supplying humidified hydrogen to the other of the electrodes to cause the hydrogen to pass through the electrolyte membrane toward the one electrode. In the second aging step, power generation of the solid polymer electrolyte fuel cell is performed at least at the maximum current density after the first aging step.

According to another aspect of the present invention, the operating method includes the steps of directly supplying water in the liquid state to the membrane electrode assembly, and performing hydrogen pump operation in a state where an electric potential is applied to the solid polymer electrolyte fuel cell, by not supplying an oxygen-containing gas to one of the electrodes and by supplying humidified hydrogen to the other of the electrodes to cause the hydrogen to pass through the electrolyte membrane toward the one electrode.

Further, according to another aspect of the present invention, the operating method includes an aging step of performing hydrogen pump operation in a state where an electric potential is applied to the solid polymer electrolyte fuel cell, by not supplying an oxygen-containing gas to one of the electrodes and by supplying humidified hydrogen to the other of the electrodes to cause the hydrogen to pass through the electrolyte membrane toward the one electrode. In the aging step, hydrogen discharged from at least the one electrode is returned to the other electrode.

Further, according to another aspect of the present invention, the operating method includes a positioning step of preparing, and positioning a plurality of fuel cell stacks each including at least one solid polymer electrolyte fuel cell, and an aging step of performing hydrogen pump operation in a state where an electric potential is applied to the fuel cell stacks, by not supplying an oxygen-containing gas to one of the electrodes and by supplying humidified hydrogen to the other of the electrodes.

In the aging step, after the hydrogen supplied to the other electrode of the fuel cell stack on the upstream side passes through the electrolyte membrane toward the one electrode, the hydrogen is supplied to the other electrode of the fuel cell stack on the downstream side.

Further, the present invention relates to an aging apparatus for performing aging of a solid polymer electrolyte fuel cell. The solid polymer electrolyte fuel cell includes a membrane electrode assembly comprising a pair of electrodes and an electrolyte membrane interposed between the electrodes. The aging apparatus includes a stack area where a plurality of fuel cell stacks each including at least one solid polymer electrolyte fuel cell are disposed, a power supply unit for applying an electric potential to the fuel cell stacks, a hydrogen supply unit for performing hydrogen pump operation when the power supply unit is operated, by not supplying an oxygen-containing gas to one of the electrodes and by supplying humidified hydrogen to the other of the electrodes.

The hydrogen supply unit includes a serial supply channel, and after the hydrogen supplied to the other electrode of the fuel cell stack on the upstream side has passed through the electrolyte membrane toward the one electrode, the hydrogen is supplied to the other electrode of the fuel cell stack on the downstream side through the serial supply channel.

In the present invention, firstly, the first aging step is performed by so called hydrogen pump operation. In the hydrogen pump operation, the voltage is applied to the fuel cell from the outside for inducing movement of hydrogen ions in the electrolyte membrane. Therefore, only hydrogen with the small overpotential is involved in the reaction, and it is possible to continuously apply large electrical current (at least the maximum electrical current density in use) to the fuel cell, below the electric potential which may cause corrosion. Accordingly, degradation of the performance is suppressed, and reduction in the time required for the aging process is achieved easily. Further, in the hydrogen pump, the hydrogen moved to one of the electrodes does not react with the oxygen-containing gas. Thus, it is very economical since no hydrogen is consumed in the first aging step.

Further, after the first aging step by the hydrogen pump operation is performed, the second aging operation by power generation is performed. Therefore, power generation can be performed for the high load (large electrical current). In this manner, the time required to finish aging is reduced significantly. Consumption of the hydrogen is reduced as much as possible for an economical aging process, and the catalyst of the fuel cell is suitably placed in the active state advantageously.

Further, in the present invention, before the aging step by so called hydrogen pump operation where the voltage is applied to the fuel cell from the outside for inducing movement of hydrogen ions in the electrolyte membrane, water in the liquid state is directly supplied to the membrane electrode assembly. Therefore, water is efficiently supplied to the membrane electrode assembly, and the resistance overpotential is effectively reduced. Further, impurities such residual solvent and adhesive component are removed from the membrane electrode assembly. That is, a cleansing function is obtained in the present invention. Further, since the electrolyte membrane is swelled by humidification, the reaction area on the catalyst surface is expanded effectively.

Further, in the present invention, the hydrogen that has moved to the one of the electrodes does not react with the oxygen-containing gas. Therefore, by returning the hydrogen discharged from the one of the electrodes to the other of the electrodes to use the hydrogen by circulation, it is not required to newly supply the hydrogen, and aging can be performed very economically.

Further, in the present invention, the hydrogen discharged from the one of the electrodes of the fuel cell stack on the upstream side is supplied to the other of the electrodes of the fuel cell stack on the downstream side. In this manner, since the hydrogen is reutilized efficiently, the amount of hydrogen supplied from outside is reduced suitably and economically.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
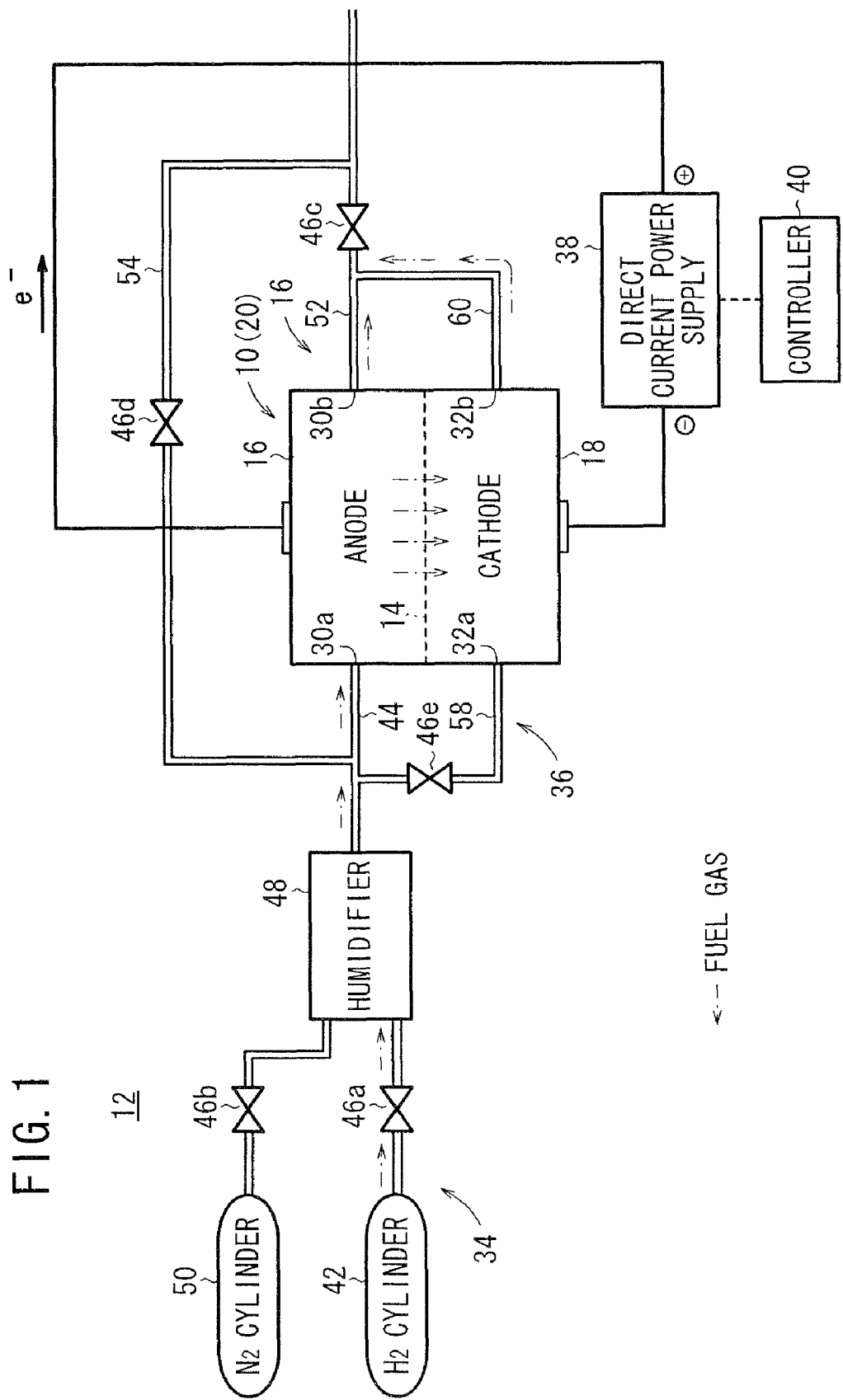
FIG. 1 is a diagram schematically showing structure of an aging apparatus for carrying out a first aging step by operating a hydrogen pump in a method of operating a solid polymer electrolyte fuel cell according to a first embodiment of the present invention.

FIG. 1 is a diagram schematically showing structure of an aging apparatus 12 for carrying out a first aging step by operating a hydrogen pump in a method of operating a solid polymer electrolyte fuel cell 10 according to a first embodiment of the present invention.

Figure 2:
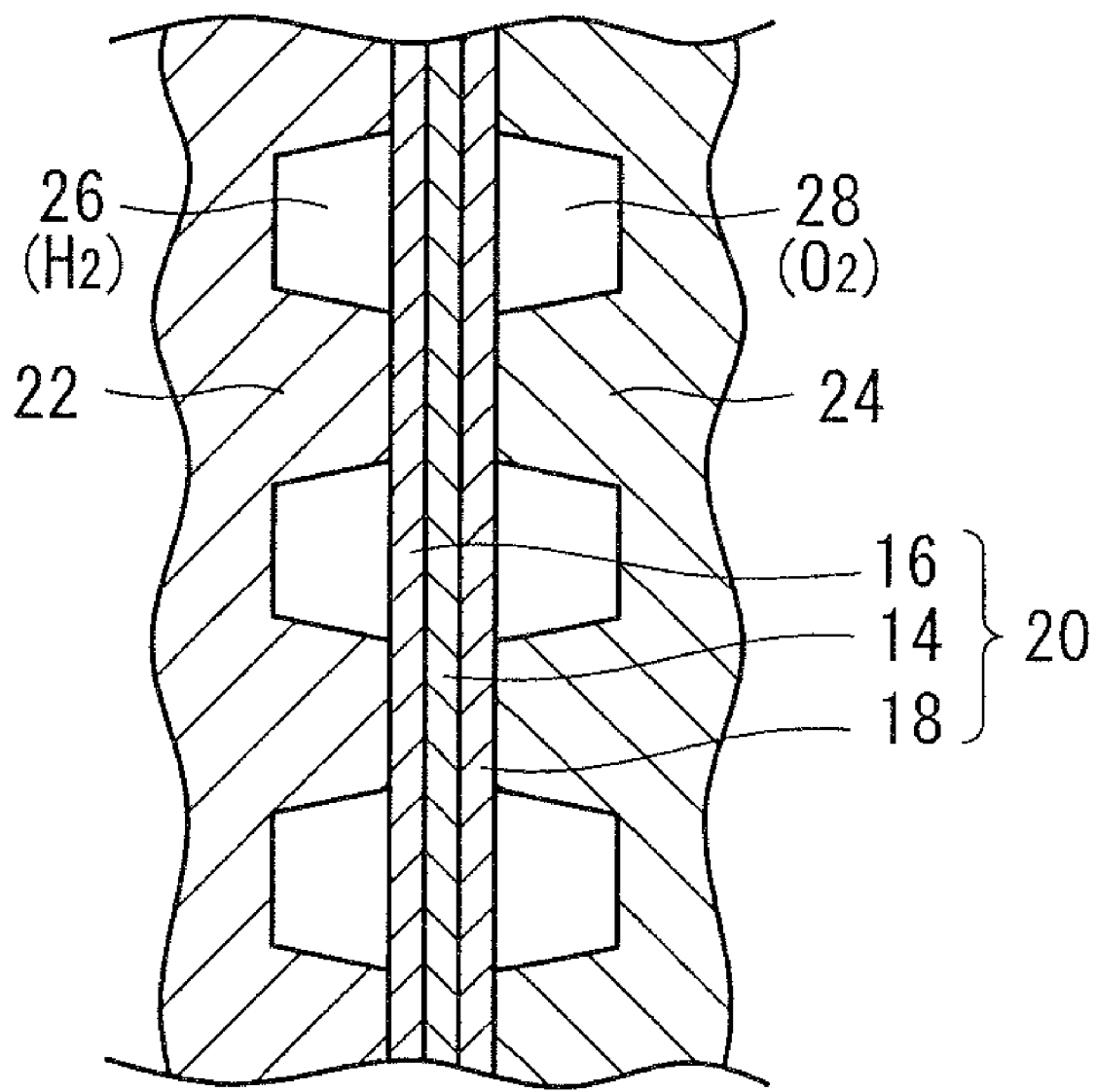
FIG. 2 is a cross sectional view showing the fuel cell.

As shown in FIG. 2, a fuel cell 10 includes a membrane electrode assembly 20 and an anode side separator 22 and a cathode side separator 24 sandwiching the membrane electrode assembly 20. The membrane electrode assembly 20 includes an anode 16, a cathode 18, and a solid polymer electrolyte membrane 14 of e.g., hydrocarbon material which is sandwiched by the anode 16 and the cathode 18. The anode side separator 22 and the cathode side separator 24 are carbon plates or metal plates, and include seal members (not shown). For example, a membrane of fluorine material such as perfluorocarbon is used for the solid polymer electrolyte membrane 14.

A fuel gas flow field 26 is formed between the membrane electrode assembly 20 and the anode side separator 22, and an oxygen-containing gas flow field 28 is formed between the membrane electrode assembly 20 and the cathode side separator 24.

As shown in FIG. 1, a fuel gas supply passage 30a for supplying a fuel gas such as a hydrogen-containing gas and an oxygen-containing gas supply passage 32a for supplying an oxygen-containing gas such as air are formed at one end of the fuel cell 10, and a fuel gas discharge passage 30b for discharging the fuel gas and an oxygen-containing gas discharge passage 32b for discharging the oxygen-containing gas are formed at the other end of the fuel cell 10.

The aging apparatus 12 includes an anode side pipe system 34 for supplying humidified hydrogen to the anode (fuel gas flow field 26) of the fuel cell 10, a cathode side pipe system 36 connected to the cathode (oxygen-containing gas flow field 28) of the fuel cell 10, and a DC power supply 38 for applying a positive electric potential to the anode of the fuel cell 10, and applying a negative electric potential to the cathode of the fuel cell 10. Further, the aging apparatus 12 includes a controller 40 for implementing the overall control of the aging apparatus 12.

The anode side pipe system 34 includes a hydrogen cylinder 42 for storing hydrogen. The hydrogen cylinder 42 is connected to the fuel gas supply passage 30a of the fuel cell 10 through an anode supply pipe 44. In the anode supply pipe 44, an open/close valve 46a is provided downstream of the hydrogen cylinder 42, and a humidifier 48 is provided downstream of the open/close valve 46a. A nitrogen cylinder 50 for supplying an inert gas such as a nitrogen gas ($N_2$ gas) is connected to the humidifier 48 through an open/close valve 46b.

Further, the anode side pipe system 34 includes an anode discharge pipe 52 connected to the fuel gas discharge passage 30b of the fuel cell 10. An open/close valve 46c is provided in the anode discharge pipe 52, and both ends of a bypass line 54 are connected to the anode discharge pipe 52 and the anode supply pipe 44. An open/close valve 46d is provided in the bypass line 54.

The cathode side pipe system 36 includes a cathode supply pipe 58. One end of the cathode supply pipe 58 is connectable to the anode supply pipe 44 through an open/close valve 46e, and the other end of the cathode supply pipe 58 is connected to the oxygen-containing gas supply passage 32a of the fuel cell 10.

Further, the cathode side pipe system 36 includes a cathode discharge pipe 60 connected to the oxygen-containing gas discharge passage 32b of the fuel cell 10. The cathode discharge pipe 60 is connected to the anode discharge pipe 52, upstream of the open/close valve 46c.

Figure 3:
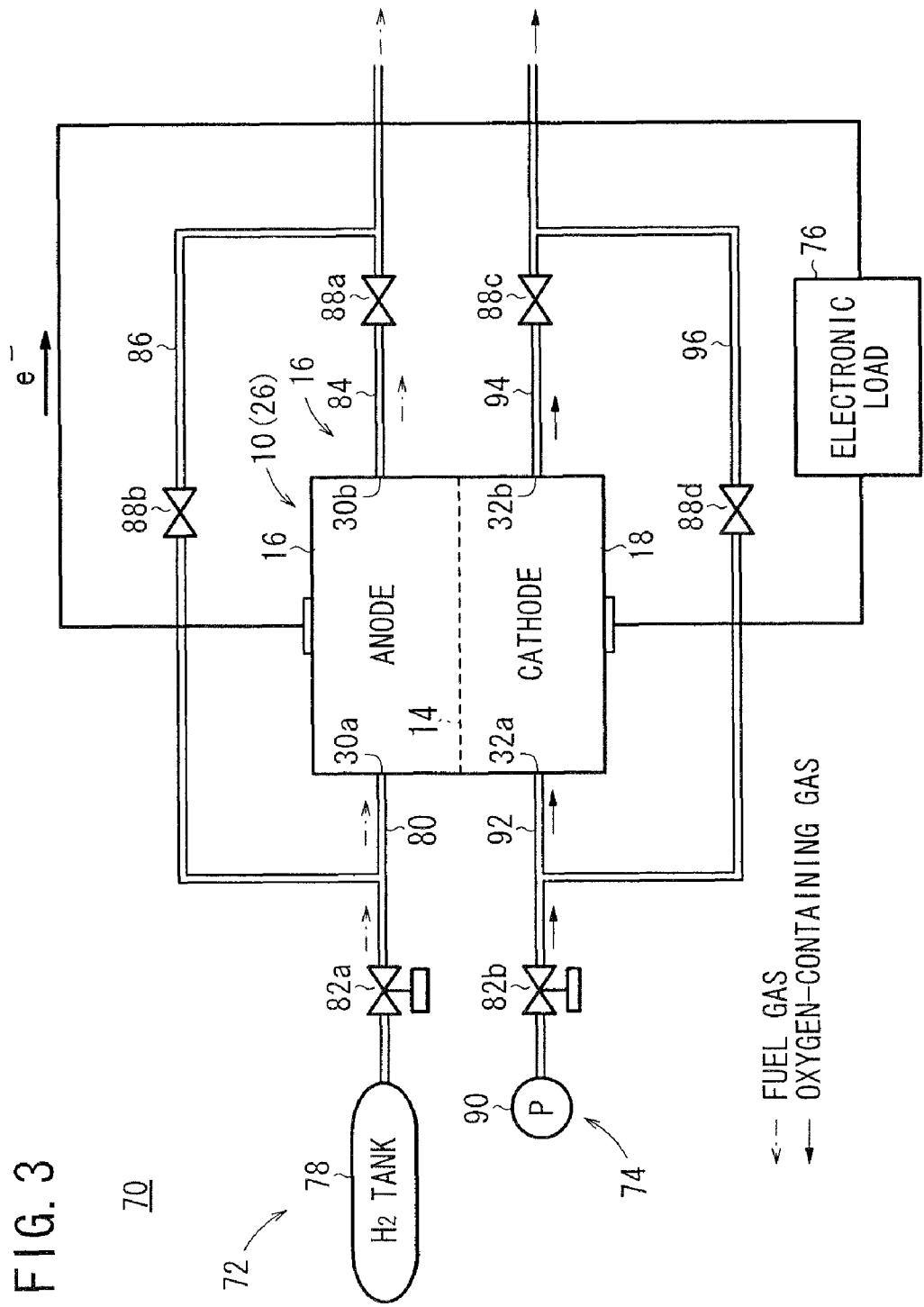
FIG. 3 is a diagram schematically showing a power generation aging apparatus for carrying out a second aging step for the fuel cell.

FIG. 3 is a diagram schematically showing structure of a power generation aging apparatus 70 for carrying out a second aging step for the fuel cell 10 after the first aging step has been carried out by the aging apparatus 12. It should be noted that the power generation aging apparatus 70 may be an apparatus dedicated for use of power generation aging. Alternatively, the power generation aging apparatus 70 may perform power generation aging by a fuel cell system including the fuel cell 10 mounted in a vehicle.

The power generation aging apparatus 70 includes a fuel gas supply system 72 for supplying the fuel gas to the fuel cell 10, an oxygen-containing gas supply system 74 for supplying the oxygen-containing gas to the fuel cell 10, and an electronic load 76 connected to the fuel cell 10.

The fuel gas supply system 72 includes a hydrogen tank 78, and a hydrogen gas is supplied from the hydrogen tank 78 to the fuel gas supply passage 30a through the hydrogen supply pipe 80. A variable valve 82a is provided in the hydrogen supply pipe 80.

The fuel gas supply system 72 includes a hydrogen discharge pipe 84 connected to a fuel gas discharge passage 30b. A bypass line 86 is connected to the hydrogen discharge pipe 84 and the hydrogen supply pipe 80. An open/close valve 88a and an open/close valve 88b are provided in the hydrogen discharge pipe 84 and the bypass line 86, respectively.

The oxygen-containing gas supply system 74 includes an air pump (air compressor) 90, and an air supply pipe 92 connected to this air pump 90 is connected to the oxygen-containing gas supply passage 32a. A variable valve 82b is provided in the air supply pipe 92.

The oxygen-containing gas supply system 74 includes an air discharge pipe 94 connected to the oxygen-containing gas discharge passage 32b. A bypass line 96 is connected to the air discharge pipe 94 and the air supply pipe 92. An open/close valve 88c and an open/close valve 88d are provided in the air discharge pipe 94 and the bypass line 96, respectively.

The electronic load 76 has a variable resistance function. The resistance value can be configured such that the output current of the fuel cell 10 can be changed in a range of 0 to a current density which is equal to or larger than the maximum current density when the fuel cell 10 is in use. The maximum current density herein indicates a magnitude of electrical current density which does not cause degradation of the solid polymer electrolyte membrane 14 due to heat generation. For example, the maximum current density is 200% at most. Preferably, the maximum current density is 150% or less (more preferably, 125%).

Figure 4:
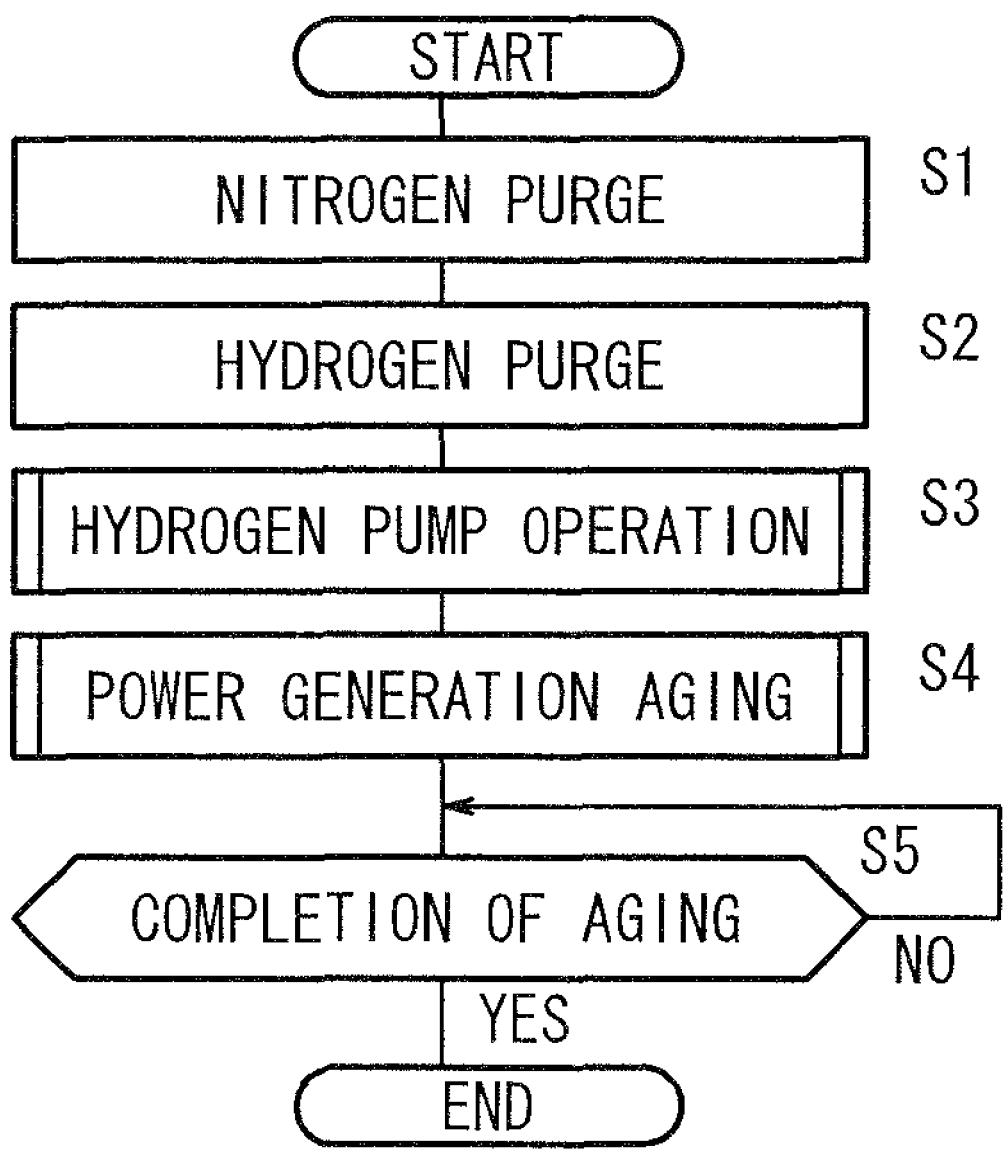
FIG. 4 is a flow chart showing the operating method.

An operating method using the aging apparatus 12 and the power generation aging apparatus 70 will be described with reference to a flow chart in FIG. 4.

Firstly, as shown in FIG. 1, after the fuel cell 10 has been attached to the aging apparatus 12, before starting so called hydrogen pump operation, a purge process using a nitrogen gas is performed (step S1). The nitrogen cylinder 50 is provided in the anode side pipe system 34. The open/close valves 46b, 46c, and 46e are opened, and the open/close valves 46a, 46d are closed.

In the structure, the nitrogen gas supplied from the nitrogen cylinder 50 is humidified when it passes through the humidifier 48. Then, the nitrogen gas flows separately into the anode supply pipe 44 and the cathode supply pipe 58. The humidified nitrogen gas is supplied to the fuel gas supply passage 30a and the oxygen-containing gas supply passage 32a of the fuel cell 10.

In the fuel cell 10, as shown in FIG. 2, the humidified nitrogen gas flows into the fuel gas flow field 26 and the oxygen-containing gas flow field 28. For scavenging, the nitrogen gas is supplied to the fuel gas flow field 26 and the oxygen-containing gas flow field 28 for a predetermined period of time. In this manner, the air or the like remaining in the fuel gas flow field 26 and the oxygen-containing gas flow field 28 is replaced with the nitrogen gas.

Then, the open/close valve 46b is closed, and the open/close valve 46a is opened. Thus, the hydrogen gas is discharged from the hydrogen cylinder 42. After the hydrogen gas has been humidified by the humidifier 48, the hydrogen gas flows separately into the anode supply pipe 44 and the cathode supply pipe 58. Thus, scavenging using the hydrogen gas is performed in the fuel gas flow field 26 and the oxygen-containing gas flow field 28 of the fuel cell 10 (step S2).

The process proceeds to step S3 to start a first aging step by hydrogen pump operation. In the hydrogen pump operation, as shown in FIG. 1, the plus electrode electric potential is applied to the anode 16, and the minus electrode electric potential is applied to the cathode 18.

In this state, in the cathode side pipe system 36, the open/close valve 46e is closed. In the anode side pipe system 34, the open/close valves 46b, 46d are closed, and the open/close valves 46a, 46c are opened. Thus, the hydrogen gas is supplied from the hydrogen cylinder 42 to the anode supply pipe 44. After the hydrogen gas has been humidified by the humidifier 48, the hydrogen gas flows through the fuel gas supply passage 30a of the fuel cell 10, and is supplied to the fuel gas flow field 26.

Figure 5:
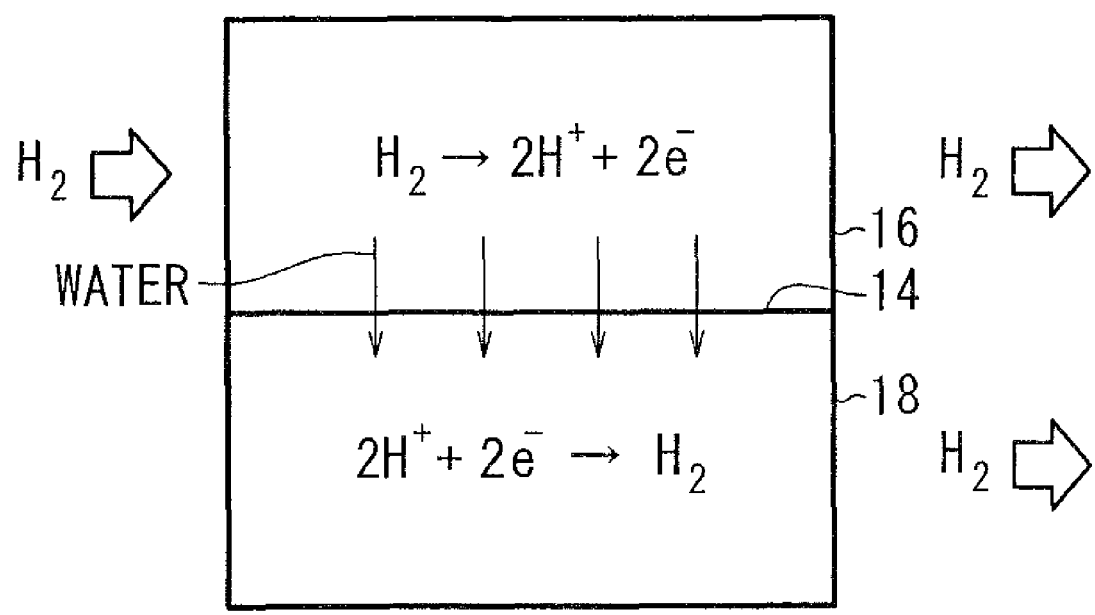
FIG. 5 is a view showing aging by the hydrogen pump operation.

In the fuel cell 10, the plus electrode electric potential is applied to the anode 16 and the minus electrode electric potential is applied to the cathode 18, by the direct current power supply 38. Thus, as shown in FIG. 5, a reaction ($H_2 \rightarrow 2H^+ + 2e^-$) is induced at the anode 16. The hydrogen ions ($H^+$) pass through the solid polymer electrolyte membrane 14, and move to the cathode 18. Then, a reaction ($2H^+ + 2e^- \rightarrow H_2$) is induced at the cathode 18.

As a result, protons (hydrogen ions) move from the anode 16 to the cathode 18, and entrained water is supplied to the solid polymer electrolyte membrane 14. The water content ratio of the solid polymer electrolyte membrane 14 is increased.

After the hydrogen gas has been supplied to the fuel gas flow field 26 of the fuel cell 10, the hydrogen gas which has not been consumed in the reaction is discharged from the fuel gas discharge passage 30b to the anode discharge pipe 52. The hydrogen gas in the oxygen-containing gas flow field 28 is discharged from the oxygen-containing gas flow field 28 to the oxygen-containing gas discharge passage 32b. Then, the hydrogen gas is discharged from the cathode discharge pipe 60 to the anode discharge pipe 52.

In the hydrogen pump operation, stoichiometric air-fuel ratio of the hydrogen supplied from the hydrogen cylinder 42 is relatively high. Thus, it is possible to increase the amount of the supplied water.

Further, the current density of the electrical current applied by the direct current power supply 38 is the maximum current density in use. Because, in the hydrogen pump operation, since only the hydrogen with the small overpotential is involved in the reaction, large electrical current can be drawn at the initial stage of aging. Thus, reduction in the time required for aging is achieved.

Further, since the cathode 18 is not affected by the concentration overpotential due to the diffusion resistance of the reactant gas, it becomes possible to prevent degradation due to local concentration of reaction on the electrode surface or distribution of the aging state. Thus, aging is performed uniformly over the electrode surface.

Further, in the case of aging by normal power generation, since it is not possible to maintain the electrical current at a certain level during aging, aging is performed by cyclic operation of the load current. Thus, the high potential cycles are repeated, and corrosion of the catalyst may be induced undesirably.

In contrast, in the case of aging by the hydrogen pump operation, it is possible to apply a large electrical current continuously, below the electric potential which may cause corrosion. Therefore, it becomes possible to suppress degradation of the performance, and reduce time required for aging. In the hydrogen pump operation, the hydrogen supplied to the cathode 18 does not react with the oxygen-containing gas, and discharged as a hydrogen gas into the anode discharge pipe 52. Thus, the hydrogen is not consumed, and the system is very economical.

Further, in the case of aging by the hydrogen pump operation, since the amount of heat generation due to the overpotential loss is reduced, it is possible to effectively prevent the temperature degradation etc. of the solid polymer electrolyte membrane 14.

In the case of aging by the hydrogen pump operation, it may not be possible to make full use of the catalyst activity. Therefore, in the first embodiment, after the first aging step by the hydrogen pump operation, the second aging step by power generation aging is performed (see step S4 and FIG. 6).

Firstly, as shown in FIG. 3, after the first aging step is finished, the fuel cell 10 is attached to the power generation aging apparatus 70. In this state, the hydrogen tank 78 of the fuel gas supply system 72 supplies the fuel gas to the fuel gas supply passage 30a through the hydrogen supply pipe 80. In the meanwhile, air is supplied from the air supply pipe 92 to the oxygen-containing gas supply passage 32a through the air pump 90 of the oxygen-containing gas supply system 74.

Figure 7:
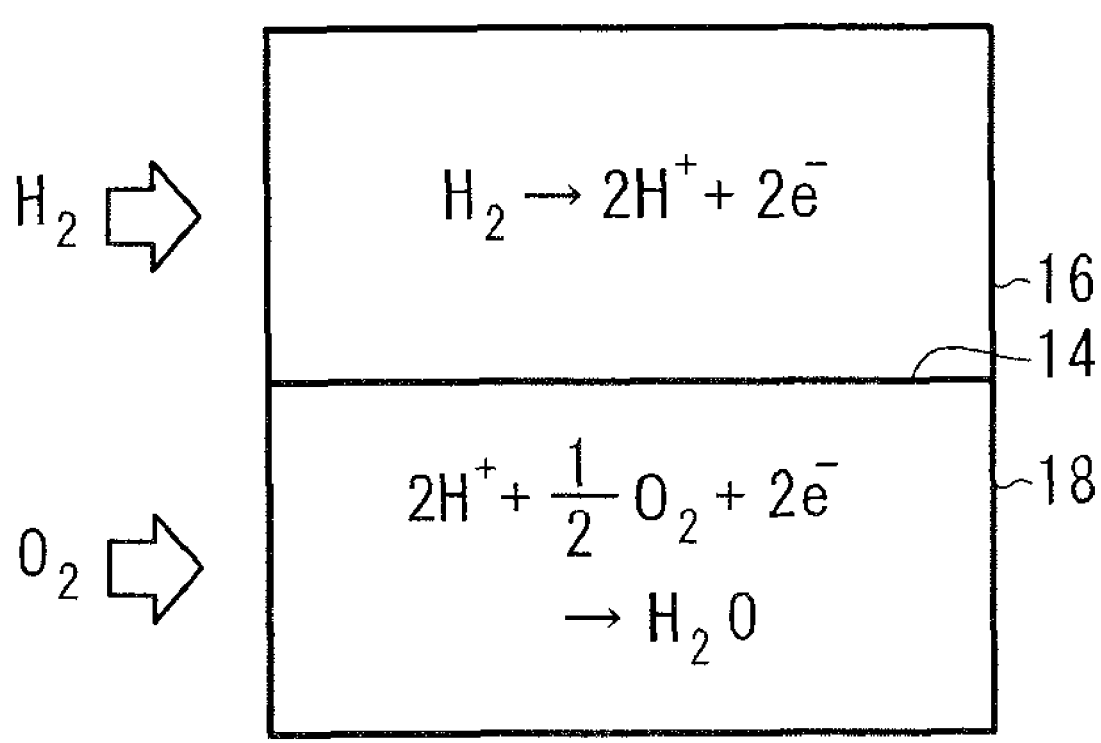
FIG. 7 is a view showing power generation aging.

Thus, as shown in FIG. 2, the hydrogen gas is supplied to the fuel gas flow field 26, and the air is supplied to the oxygen-containing gas flow field 28 to cause electrochemical reactions in the membrane electrode assembly 20. Specifically, as shown in FIG. 7, protons (hydrogen ions) produced at the anode 16 pass through the solid polymer electrolyte membrane 14 to the cathode 18, and water is produced at the cathode 18.

Figure 6:
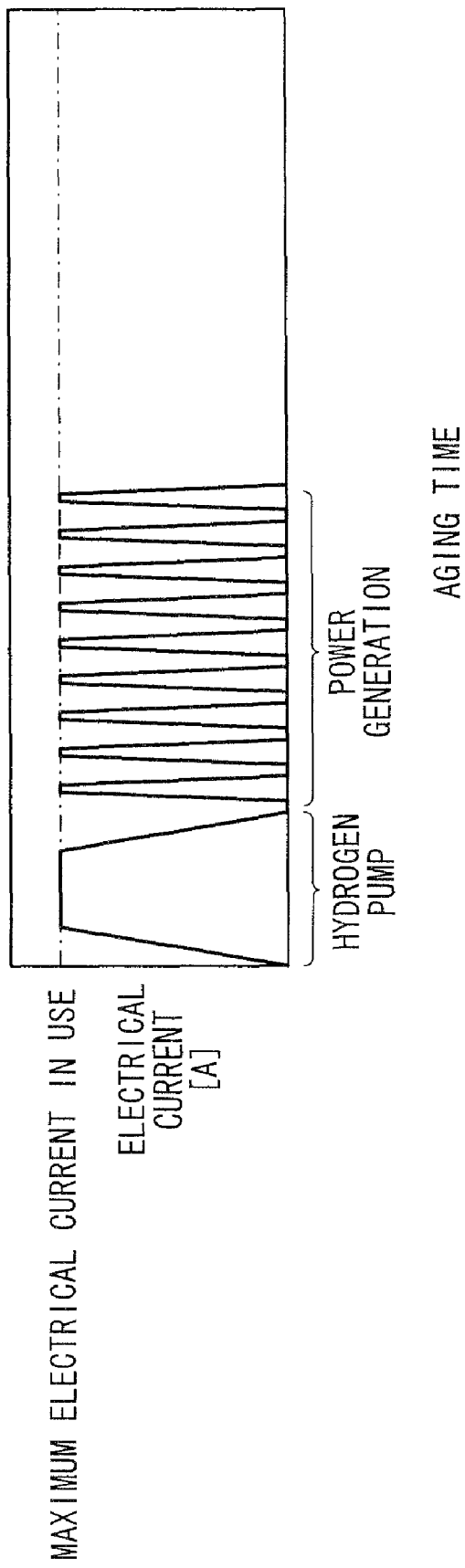
FIG. 6 is a graph showing the operating method.

In this manner, power generation in the fuel cell 10 is started. As shown in FIG. 6, the electrical current outputted from the fuel cell 10 is increased or decreased under control by the electronic load 76. Thus, power generation aging is performed. For example, after the elapse of a predetermined period of time (YES in step S5), aging operation of the fuel cell 10 is finished.

In the first embodiment, the aging process for the newly assembled fuel cell 10 is performed, firstly, by the first aging step by the hydrogen pump operation, and the second aging step by power generation aging.

In the aging step by the hydrogen pump operation, a flow of the water to the proton channel is induced reliably by application of the large electrical current, and the aging process is performed uniformly over the entire electrode surface owing to reduction in the overpotential.

Further, since hydrogen reduction of the catalyst of the cathode 18 is induced, removal of the oxidized film is achieved, and joint property at the catalyst interface is improved. Further, since the solid polymer electrolyte membrane 14 is suitably joined to the electrolyte interface in the catalyst layer, protons can be given and received at the interface smoothly.

After aging by the hydrogen pump operation is performed, power generation aging is performed. Thus, in the power generation aging, it is possible to carry out the power generation for a high load. Unlike the conventional technique where only the power generation aging is performed, it is not necessary to gradually increase the output electrical current from a low level. Thus, the time required to finish the aging process is reduced significantly.

In this manner, it is possible to reduce hydrogen consumption as much as possible, and carry out the aging process economically. Further, the catalyst of the fuel cell 10 is suitably placed in the active state advantageously.

Figure 8:
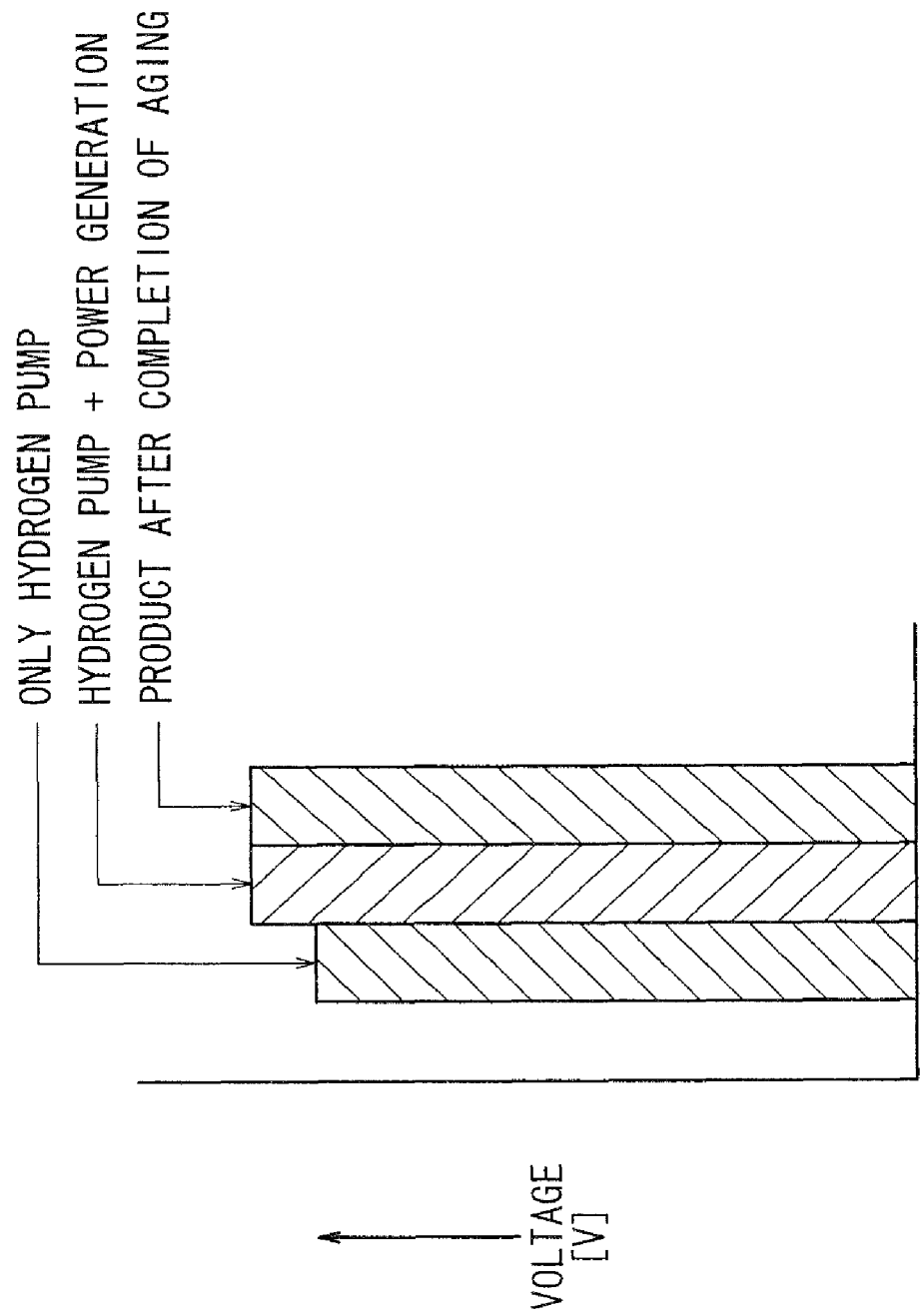
FIG. 8 is a graph showing performance comparison between various aging operations.

FIG. 8 shows power generation performance results obtained in comparison between the case in which aging is performed only by hydrogen pump operation and the case of the first embodiment in which aging by hydrogen pump operation and aging by power generation aging are performed in combination. As can be seen from FIG. 8, in comparison with the case in which aging is performed only by hydrogen pump operation, in the first embodiment, it is possible to achieve the perfect catalyst activity in the fuel cell 10 as if normal aging were completed.

In the first embodiment, the plus electrode electric potential is applied to the anode, and the minus electrode electric potential is applied to the cathode. Without supplying any oxygen-containing gas to the cathode, the humidified hydrogen is supplied to the anode for performing the hydrogen pump operation. Conversely, the plus electrode electric potential may be applied to the cathode, and the minus electrode electric potential may be applied to the anode. In this case, without supplying any oxygen-containing gas to the anode, the humidified hydrogen is supplied to the cathode for performing the hydrogen pump operation.

Figure 9:
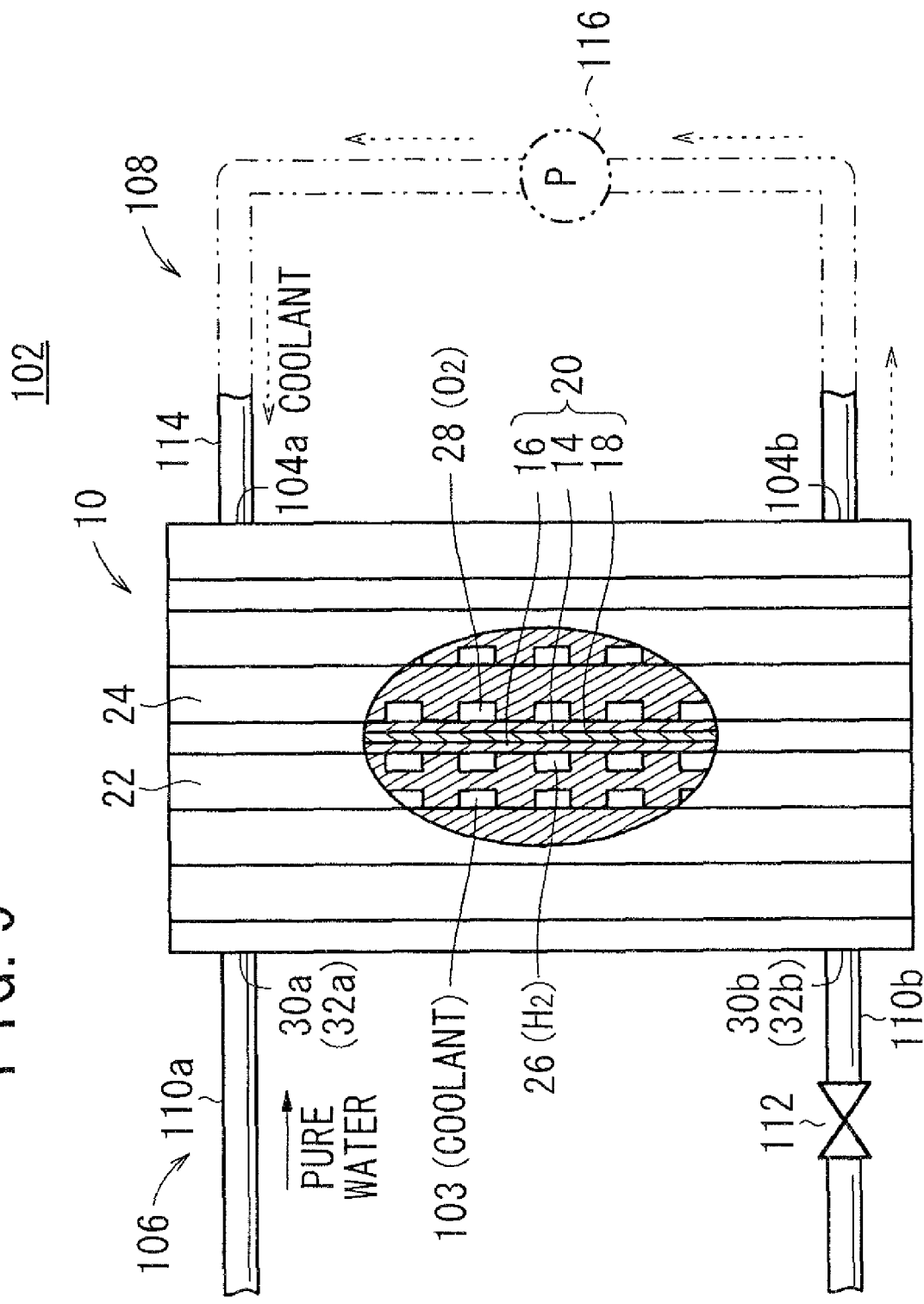
FIG. 9 is a view schematically showing a hot water treatment apparatus for supplying hot water in the liquid state to a membrane electrode assembly in a method of operating a solid polymer electrolyte fuel cell according to a second embodiment of the present invention.

FIG. 9 is a view schematically showing a hot water treatment apparatus 102 for supplying hot water (pure water) in the liquid state to a membrane electrode assembly 20 in a method of operating a solid polymer electrolyte fuel cell 10 according to a second embodiment of the present invention.

The fuel cell 10 includes a coolant flow field 103 between an anode side separator 22 and a cathode side separator 24. A fuel gas supply passage 30*a*, an oxygen-containing gas supply passage 32*a*, a fuel gas discharge passage 30*b*, and an oxygen-containing gas discharge passage 32*b* are formed at one end of the fuel cell 10. A coolant supply passage 104*a* for supplying a coolant and a coolant discharge passage 104*b* for discharging the coolant are formed at the other end of the fuel cell 10.

The hot water treatment apparatus 102 includes a hot water supply system 106 for supplying hot water to the fuel cell 10 and a heat retention medium supply system 108 for heat retention of the fuel cell 10. The hot water supply system 106 includes, e.g., a hot water supply pipe 110*a* connected to the fuel gas supply passage 30*a* (and/or the oxygen-containing gas supply passage 32*a*) and a hot water discharge pipe 110*b* connected to the fuel gas discharge passage 30*b* (and/or the oxygen-containing gas discharge passage 32*b*). An open/close valve 112 is provided in the hot water discharge pipe 110*b*. For example, hot water (pure water) having a predetermined temperature, e.g., maintained in a range of 40° C. to 100° C. is supplied to the hot water supply pipe 110*a*.

The heat retention medium supply system 108 has a circulation pipe 114 connected to the coolant supply passage 104*a* and the coolant discharge passage 104*b*. A pump 116 is provided in the circulation pipe 114. For example, coolant (in the liquid or gas state) having a predetermined temperature, e.g., maintained in a range of 40° C. to 100° C. is circulated in the circulation pipe 114.

After hot water treatment of the fuel cell 10, the aging apparatus 12 according to the first embodiment is used for performing the first aging step by the hydrogen pump operation. Further, after the first aging step, the power generation aging apparatus 70 according to the first embodiment is used for performing the second aging step for the fuel cell 10.

Figure 10:
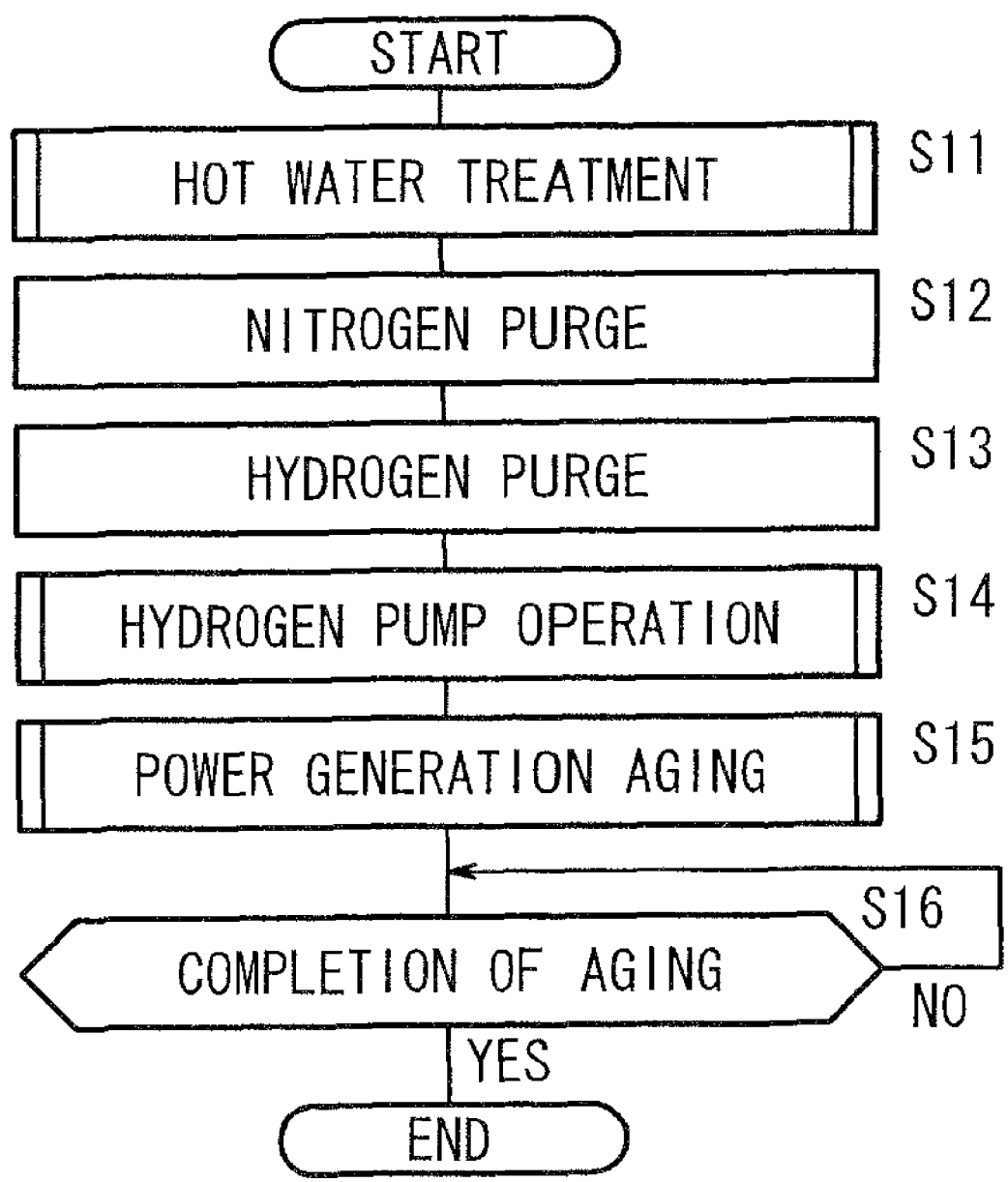
FIG. 10 is a flow chart showing the operating method.

An operating method using the hot water treatment apparatus 102, the aging apparatus 12, and the power generation aging apparatus 70 will be described with reference to a flow chart shown in FIG. 10. The operating method using the aging apparatus 12 and the power generation aging apparatus 70 is the same as that of the first embodiment, and description thereof is omitted.

Firstly, as shown in FIG. 9, the fuel cell 10 is attached to the hot water treatment apparatus 102 for performing hot water treatment of the fuel cell 10 (step S11). Specifically, in the hot water supply system 106, the pure water (hot water) is supplied to the fuel gas supply passage 30*a* and/or the oxygen-containing gas supply passage 32*a* through the hot water supply pipe 110*a*. For example, it is assumed that the pure water heated to a predetermined temperature is supplied to the fuel gas supply passage 30*a*.

At this time, the open/close valve 112 is closed, and the hot water discharge pipe 110*b* is closed (plugged). Therefore, the hot water is introduced into the fuel gas flow field 26 from the fuel gas supply passage 30*a*, thereby filling the fuel gas flow field 26 with the hot water. That is, the hot water is supplied into the fuel cell 10 before the aging process, and the pure water in the liquid state is directly supplied to the membrane electrode assembly 20.

In the heat retention medium supply system 108, by operation of the pump 116, the coolant maintained to have the predetermined temperature is circulated through the circulation pipe 114 connected to the coolant supply passage 104*a* and the coolant discharge passage 104*b*. In the structure, the coolant is supplied to the coolant flow field 103 by circulation, and heat retention of the fuel cell 10 is achieved.

The time required for performing the hot water treatment depends on the hydrophilic property of the solid polymer electrolyte membrane 14. If the solid polymer electrolyte membrane 14 has high hydrophilic property, the hot water treatment is performed for a short period of time. If the solid polymer electrolyte membrane 14 has low hydrophilic property, the hot water treatment is performed for a long period of time. In practice, the hot water treatment is performed for a period of time in a range of several hours to several tens of hours.

After the hot water treatment is finished, the fuel cell 10 is attached to the aging apparatus 12. In the aging apparatus 12, before starting the hydrogen pump operation, a purge process using the nitrogen gas (step S12) and scavenging using the hydrogen gas (step S13) are performed.

Then, the process proceeds to step S14 for performing the first aging step by the hydrogen pump operation, and thereafter, the process proceeds to step S15 for performing the second aging step by power generation aging. Thus, power generation aging is performed, and after the elapse of a predetermined period of time (YES in step S16), aging operation for the fuel cell 10 is finished.

As described above, in the second embodiment, before the aging step by the hydrogen pump operation using the aging apparatus 12, the step of directly supplying the water in the liquid state to the membrane electrode assembly 20 of the fuel cell 10 is performed by the hot water treatment apparatus 102. Therefore, it is possible to efficiently supply the water into the solid polymer electrolyte membrane 14. It is possible to effectively reduce the resistance overpotential, and the time required for aging is reduced suitably.

Further, the remaining solvent or impurities such as adhesive components are removed from the membrane electrode assembly 20, and the membrane electrode assembly 20 is cleansed. Moreover, by swelling of the humidified solid polymer electrolyte membrane 14, the reaction area in the catalyst surface is expanded effectively.

Figure 11:
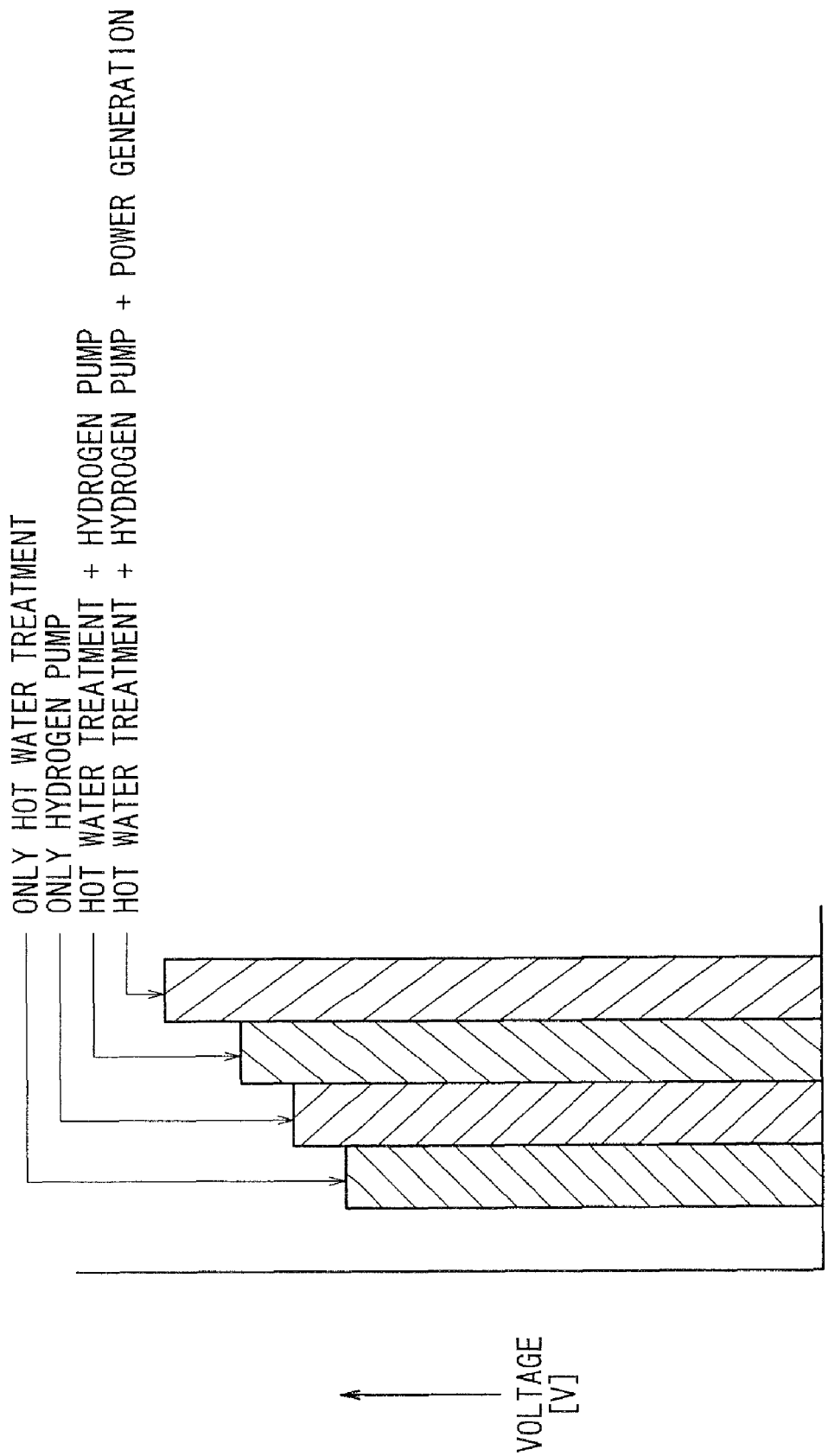
FIG. 11 is a graph showing performance comparison between various aging operations.

FIG. 11 shows power generation performance results obtained in comparison among the case in which aging is performed only by the hot water treatment, the case in which aging is performed only by the hydrogen pump operation, the case in which aging by the hot water treatment and aging by the hydrogen pump operation are performed in combination, and the case of the second embodiment in which aging by the hot water treatment, aging by the hydrogen pump operation, and aging by the power generation aging are performed in combination. As can be seen from FIG. 11, in the second embodiment, it is possible to achieve the perfect catalyst activity in the fuel cell 10.

In the second embodiment, before the aging step by the hydrogen pump operation using the aging apparatus 12, the step of supplying the hot water to the membrane electrode assembly 20 is performed by the hot water treatment apparatus 102. However, the present invention is not limited in this respect. For example, the hot water may be supplied to the membrane electrode assembly 20 by soaking the entire fuel cell 10 in a hot water bath. Further, instead of the heat retention medium supply system 108 for heat retention of the fuel cell 10, a heat retention furnace for heat retention of the entire fuel cell 10 may be used.

Figure 12:
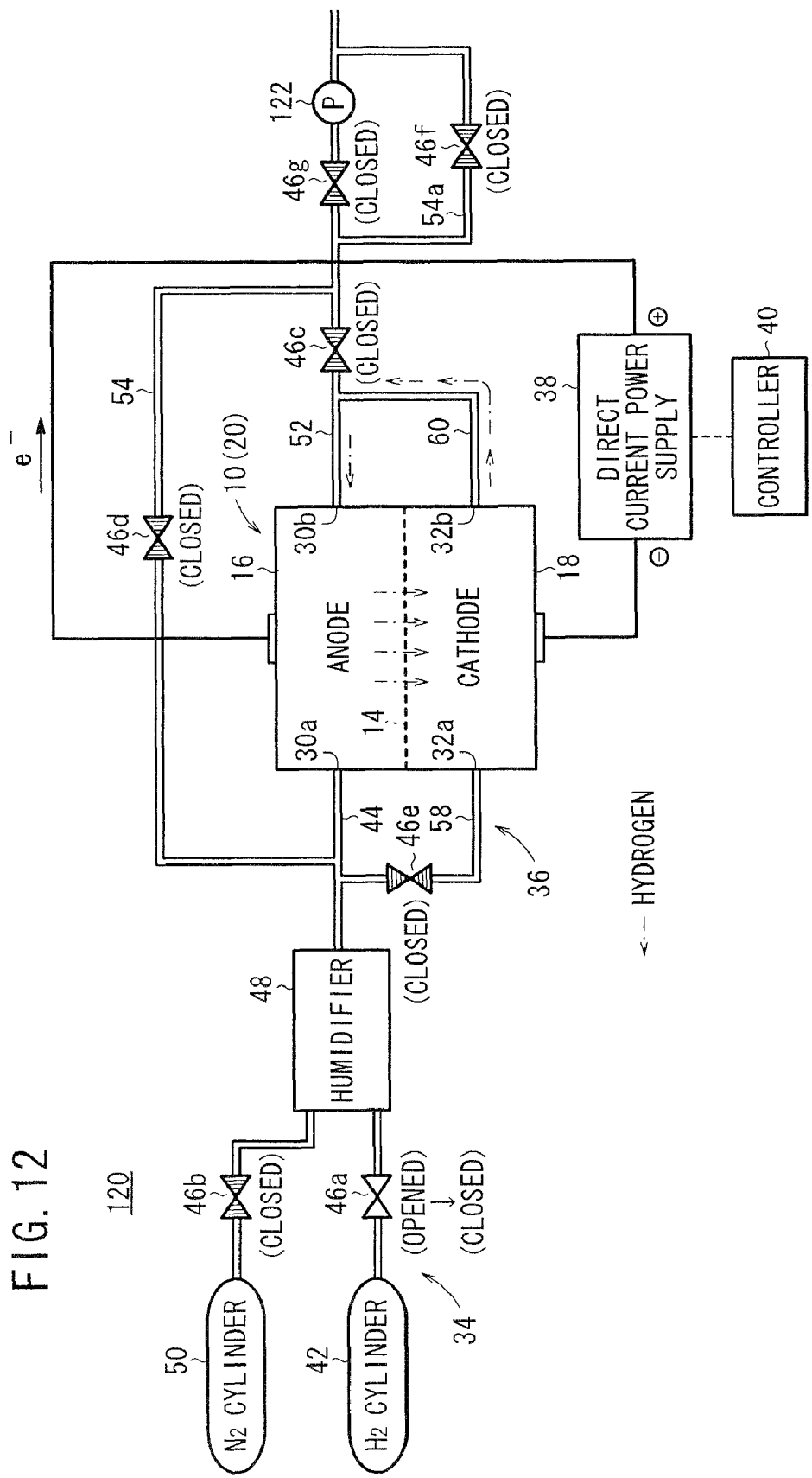
FIG. 12 is a diagram schematically showing structure of an aging apparatus for carrying out an aging step by operating a hydrogen pump in a method of operating a solid polymer electrolyte fuel cell according to a third embodiment of the present invention.

FIG. 12 is a diagram schematically showing structure of an aging apparatus 120 for carrying out a first aging step by operating a hydrogen pump, in a method of operating a solid polymer electrolyte fuel cell 10 according to a third embodiment of the present invention. The constituent elements of the aging apparatus 120 that are identical to those of the aging apparatus 12 according to the first embodiment are labeled with the same reference numerals, and detailed descriptions thereof are omitted.

The aging apparatus 120 has an anode discharge pipe 52 also having a function of a hydrogen circulation channel as described later, and a bypass line 54a provided downstream of the anode discharge pipe 52. An open/close valve 46f is provided in the bypass line 54a, and a pump 122 is provided downstream of the anode discharge pipe 52 through an open/close valve 46g.

After the first aging step by the aging apparatus 120, the power generation aging apparatus 70 of the first embodiment is used for performing the second aging step for the fuel cell 10.

Figure 13:
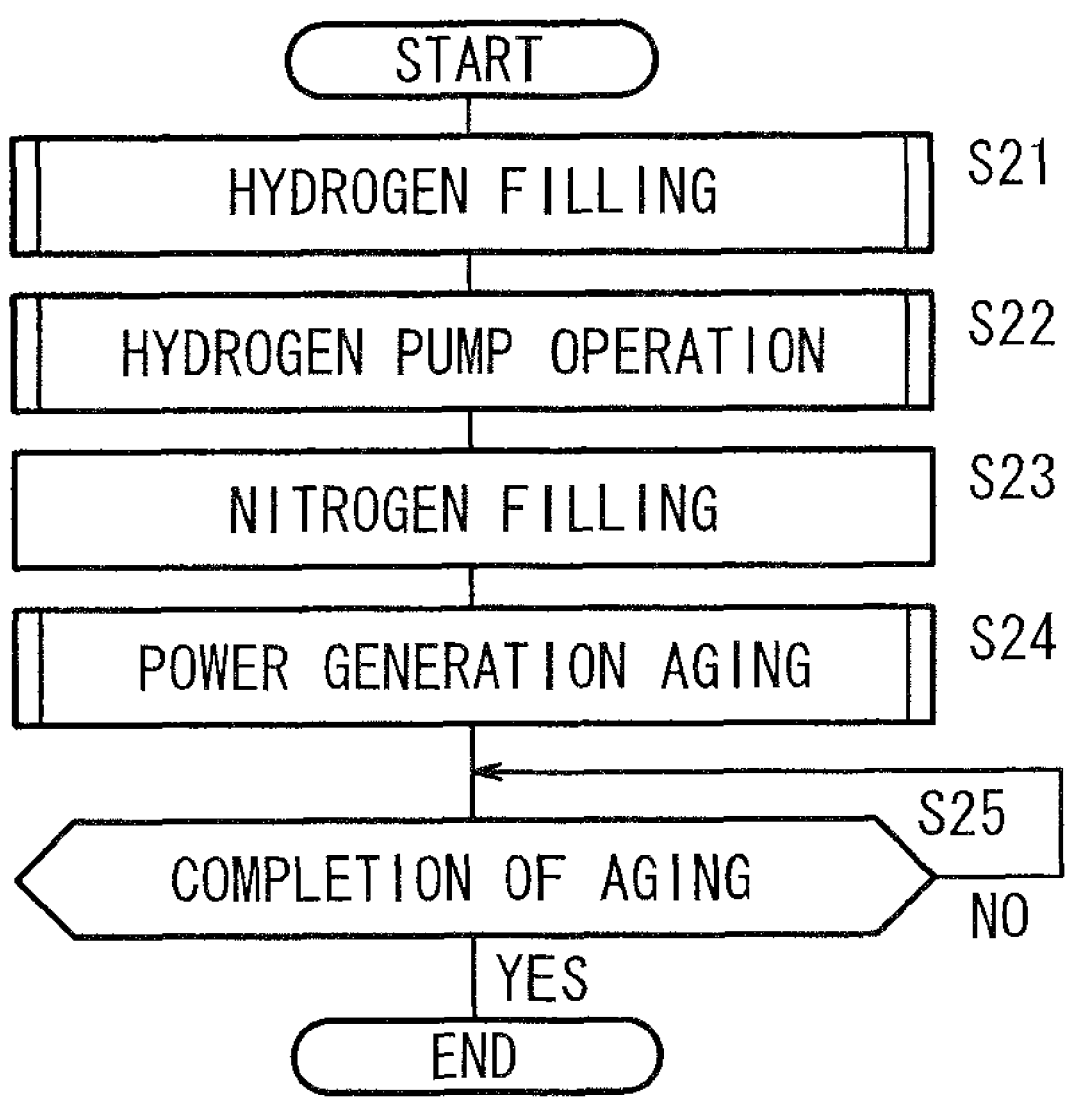
FIG. 13 is a flow chart showing the operating method.
Figure 14:
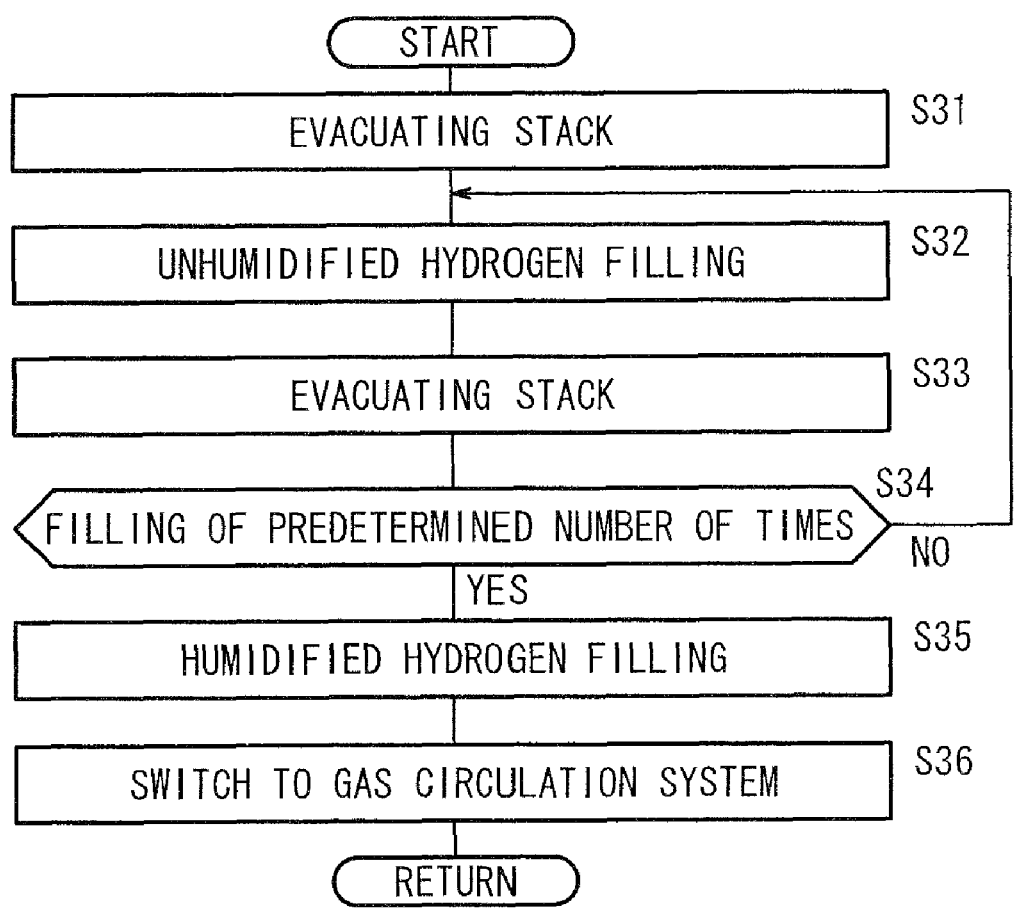
FIG. 14 is a flow chart showing a manner of hydrogen filling in the operating method.

An operating method by the aging apparatus 120 and the power generation aging apparatus 70 will be described with reference to flow charts shown in FIGS. 13 and 14. Descriptions of the operating method by the power generation aging apparatus 70 are omitted.

Figure 15:
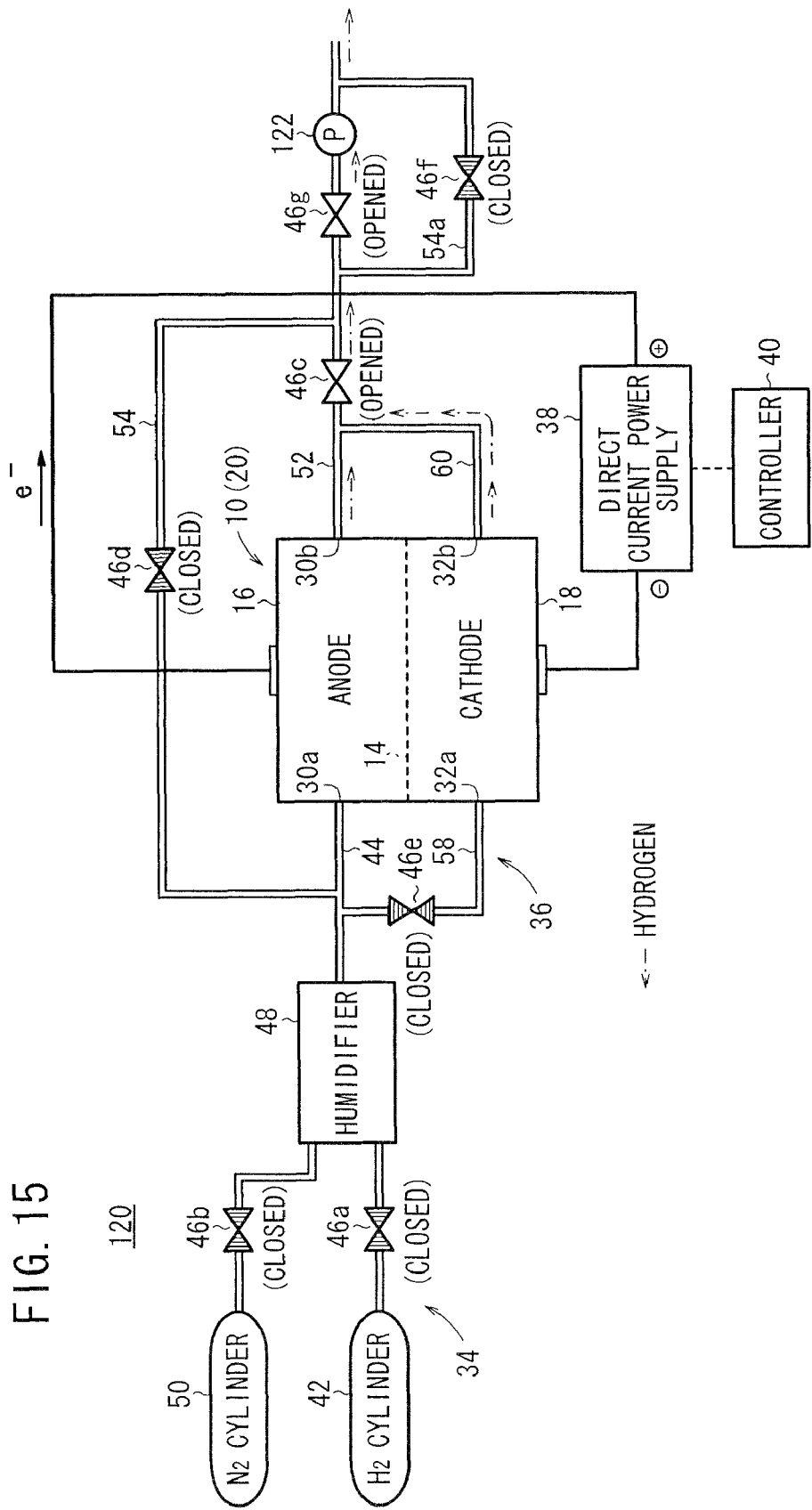
FIG. 15 is a diagram showing operation of pressure reduction at the time of hydrogen filling.

Firstly, as shown in FIG. 12, after the fuel cell is attached to the aging apparatus 120, a hydrogen filling process is performed before starting the hydrogen pump operation (step S21). In the hydrogen filling operation, as shown in FIG. 15, the open/close valves 46a, 46b, 46d, 46e, and 46f are closed, and the open/close valves 46c, 46g are opened. In this state, the pump 122 is operated for reducing the pressure of the channel to be filled with the hydrogen, i.e., the anode supply pipe 44, the anode discharge pipe 52, the cathode supply pipe 58, and the cathode discharge pipe 60 (step S31 in FIG. 14).

Figure 16:
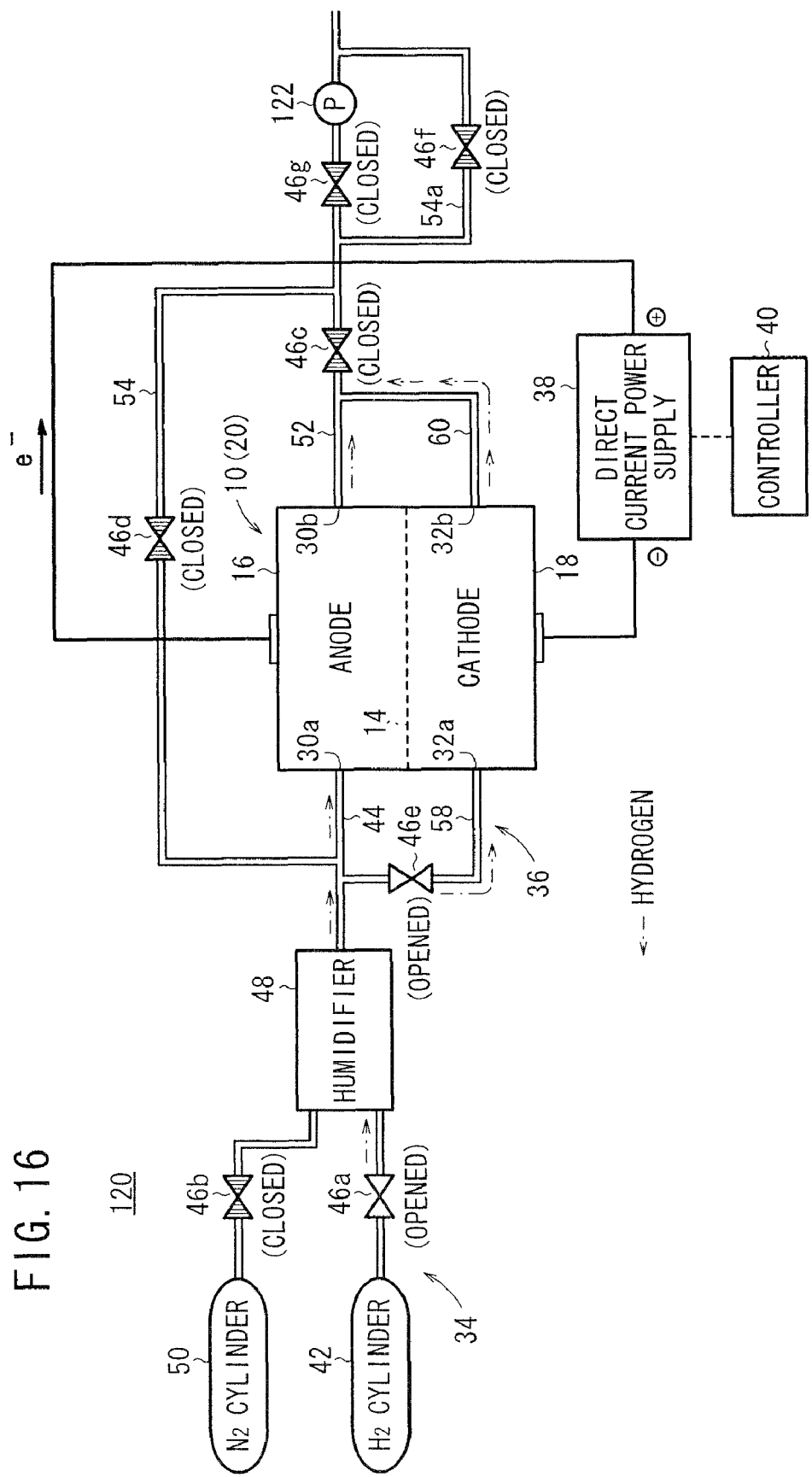
FIG. 16 is a diagram showing the hydrogen filling operation.

Then, as shown in FIG. 16, the open/close valve 46c is closed (and as necessary, the open/close valve 46g is closed). Further, the open/close valves 46a, 46e are opened. Thus, the hydrogen in the hydrogen cylinder 42, which has not been humidified by the humidifier 48, is sucked into the fuel gas flow field 26 from the anode supply pipe 44, and also sucked into the oxygen-containing gas flow field 28 from the cathode supply pipe 58.

When the fuel cell 10 is filled with the unhumidified hydrogen (step S32), the open/close valve 46a, 46e are closed, and the open/close valves 46c, 46g are opened (see FIG. 15). In this state, by operation of the pump 122, the fuel cell 10 is evacuated through the anode discharge pipe 52 and the cathode discharge pipe 60 (step S33).

If it is determined that the above steps S32 and S33 are performed predetermined number of times (YES in step S34), the process proceeds to step S15. In step S15, as shown in FIG. 12, the open/close valve 46a is opened, and the open/close valves 46c, 46g are closed. Thus, the hydrogen supplied from the hydrogen cylinder 42 is humidified by the humidifier 48, and the anode of the fuel cell 10 is filled with the hydrogen.

Further, since the open/close valve 46c is closed, the gas circulation system is switched such that the anode discharge pipe 52 functions as a hydrogen circulation channel (step S36). Thus, control before starting the hydrogen pump operation is finished.

In the hydrogen gas filling process, the pressure in the fuel cell 10 is reduced by the pump 122. Therefore, hydrogen replacement is carried out in a short period of time. The amount of consumption of the hydrogen gas is reduced effectively and economically. Further, since mixing of the hydrogen and the oxygen in the electrode is suppressed as much as possible, degradation of the catalyst is suppressed.

Then, the process proceeds to step S22 for performing the first aging step by so called hydrogen pump operation. In the hydrogen pump operation, the hydrogen gas in the oxygen-containing gas flow field 28 of the fuel cell 10 flows from the oxygen-containing gas flow field 28 to the oxygen-containing gas discharge passage 32b, and the hydrogen gas is discharged from the cathode discharge pipe 60 to the anode discharge pipe 52 as the circulation channel. The hydrogen gas discharged to the anode discharge pipe 52 is supplied to the anode 16 through the fuel gas discharge passage 30b.

In this manner, in the third embodiment, the hydrogen gas produced at the cathode 18 is circulated for use. Therefore, it is not necessary to newly supply the hydrogen gas from the hydrogen cylinder 42 to the anode 16. Therefore, the first aging by the hydrogen pump operation can be carried out highly economically.

After the hydrogen pump operation is finished, a nitrogen filling process is performed (step S23). The nitrogen filling process is performed in the same manner as the above hydrogen filling process (step S21), and it will be described briefly. As shown in FIG. 15, the open/close valves 46a, 46b, 46d, 46e, and 46f are closed, and the open/close valves 46c, 46g are opened. In this state, the pump 122 is operated. As a result, the atmosphere in the fuel cell 10 is evacuated. Since the hydrogen gas remaining in the fuel cell 10 is evacuated, the pressure in the fuel cell 10 is reduced.

Then, when the open/close valve 46c is closed, and the open/close valve 46b is opened, the nitrogen gas discharged from the nitrogen cylinder 50 is sucked into the fuel cell 10. Thus, the fuel cell 10 is filled with the nitrogen gas. At this time, the pressure in the fuel cell 10 is reduced by the pump 122, and the amount of nitrogen consumption is reduced effectively, and economically.

After the first aging step by the hydrogen pump operation, the second aging step by power generation aging is performed (step S24). After the power generation aging is performed, e.g., for a predetermined period of time (YES in step S25), aging operation for the fuel cell 10 is finished.

Figure 17:
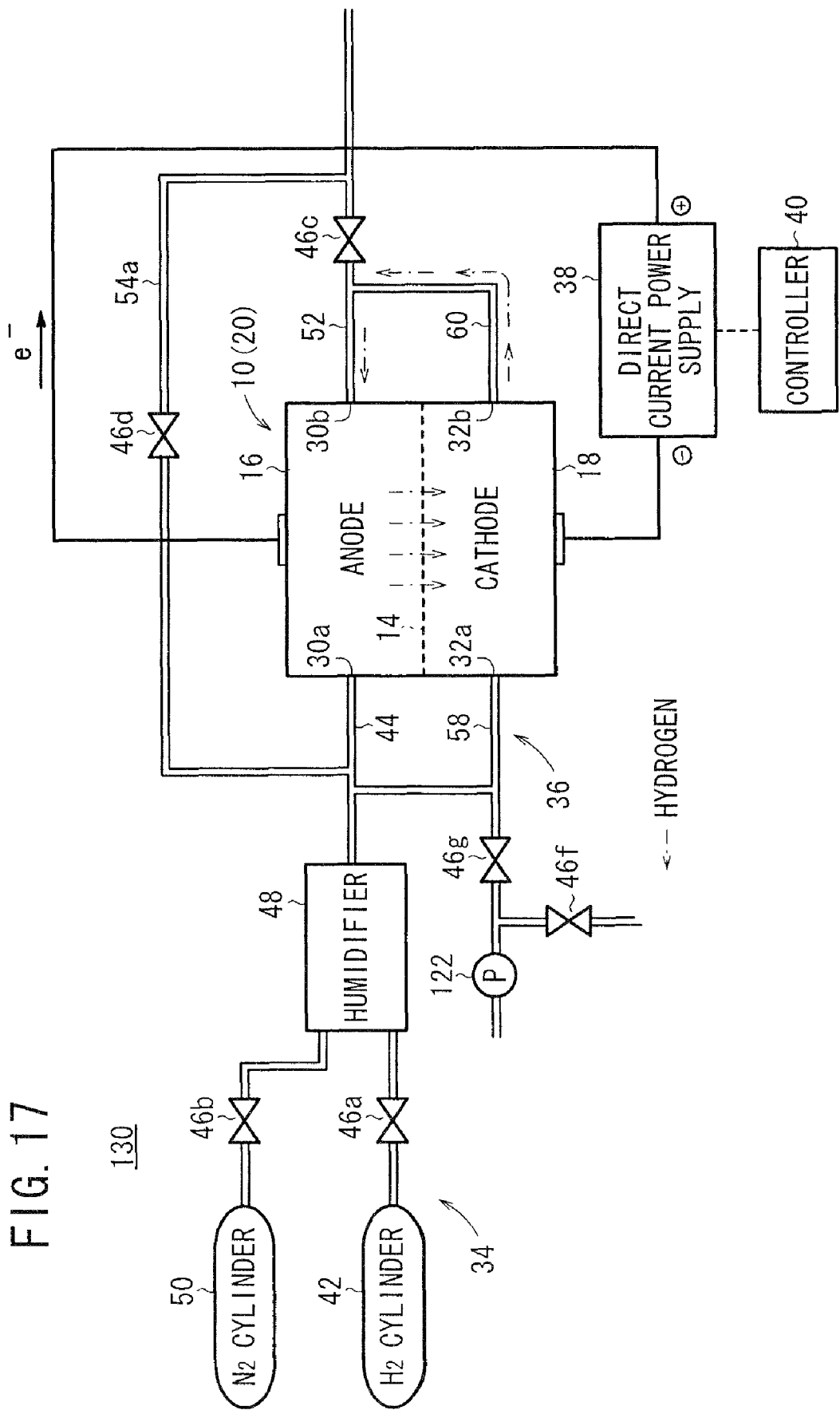
FIG. 17 is a diagram schematically showing structure of an aging apparatus for carrying out a first aging step by operating a hydrogen pump in an operating method according to a fourth embodiment of the present invention.

FIG. 17 is a diagram schematically showing structure of an aging apparatus 130 for carrying out a first aging step by operating a hydrogen pump in an operating method according to a fourth embodiment of the present invention. The constituent elements of the aging apparatus 130 that are identical to those of the aging apparatus 120 according to the third embodiment are labeled with the same reference numerals, and detailed descriptions thereof are omitted.

The aging apparatus 130 includes a cathode side pipe system 36 having a cathode supply pipe 58. A pump 122 is connected to the cathode supply pipe 58 through an open/close valve 46g. An open/close valve 46f is provided between the open/close valve 46g and the pump 122. In an anode side pipe system 34 of the aging apparatus 130, the open/close valves 46f, 46g and the pump 122 are not provided in the anode discharge pipe 52.

In the fourth embodiment, in the hydrogen filling process (step S21 in FIG. 13) and the nitrogen filling process (step S23), by operation of the pump 122, the pressure in the fuel cell 10 is reduced. Therefore, at the time of supplying the hydrogen to the fuel cell 10, the atmosphere in the fuel cell 10 can be replaced reliably with the hydrogen in a short period of time. In the fourth embodiment, the same advantages as in the case of the third embodiment are obtained. For example, since mixing of the hydrogen and the oxygen in the electrode is suppressed as much as possible, degradation of the catalyst is suppressed effectively.

Figure 18:
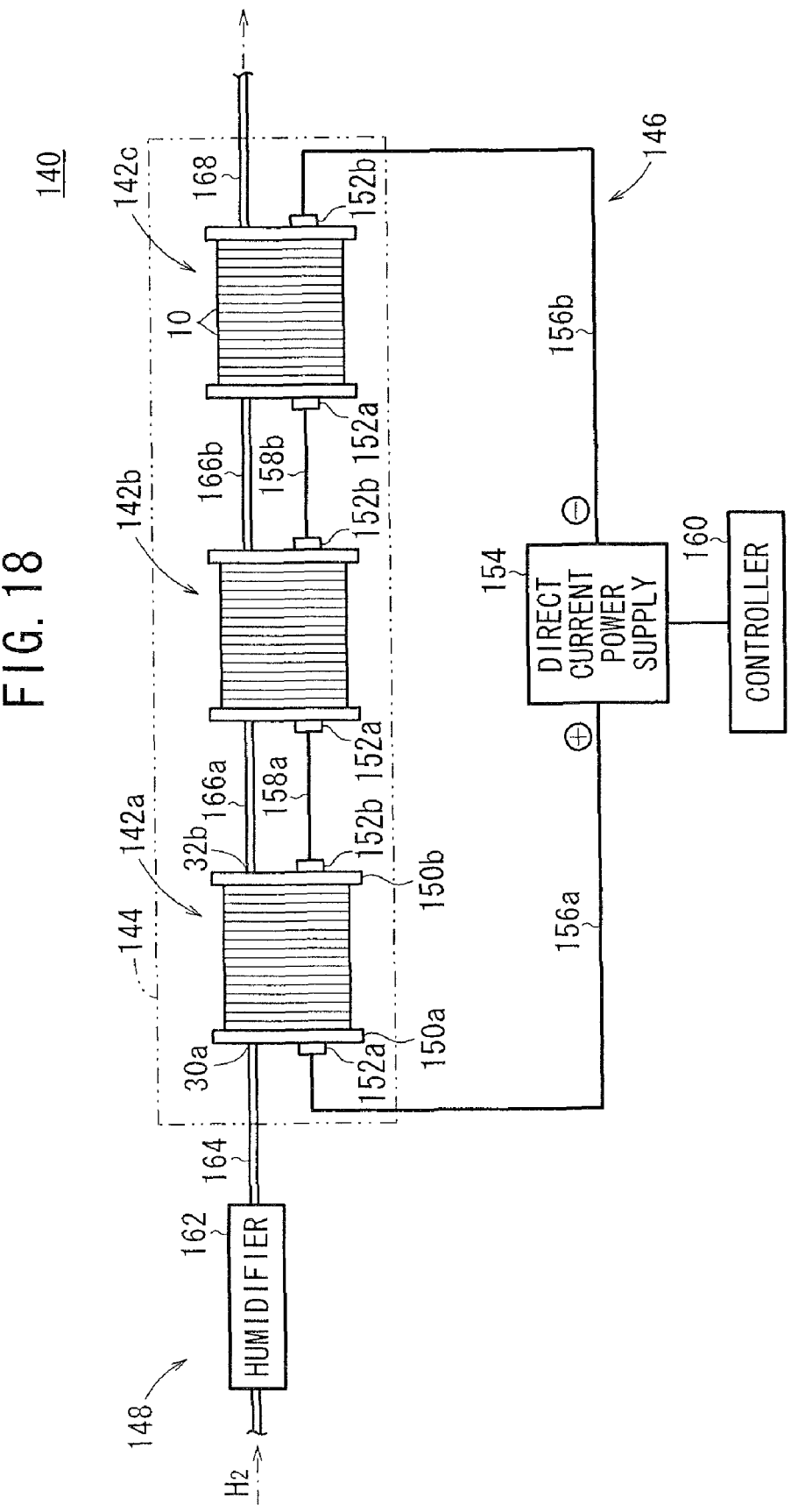
FIG. 18 is a diagram schematically showing an aging apparatus for carrying out an aging step by operating a hydrogen pump in a method of operating a solid polymer electrolyte fuel cell according to a fifth embodiment of the present invention.

FIG. 18 is a diagram schematically showing an aging apparatus 140 for carrying out an aging step by operating a hydrogen pump in a method of operating a solid polymer electrolyte fuel cell 10 according to a fifth embodiment of the present invention.

The aging apparatus 140 includes a stack area 144 for placing a plurality of fuel cell stacks (in FIG. 18, three fuel cell stacks 142a to 142c are placed). Each of the fuel cell stacks 142a to 142c includes at least one fuel cell 10. Further, the aging apparatus 140 includes a power supply unit 146 for supplying a plus electrode electric potential to the anode of the fuel cell 10, and a minus electrode electric potential to the cathode of the fuel cell 10. Further, the aging apparatus 140 includes a hydrogen supply unit 148 for supplying humidified hydrogen to the anode to perform hydrogen pump operation.

In practice, each of the fuel cell stacks 142a to 142c includes a predetermined number of, e.g., one fuel cell 10, several tens of fuel cells 10, or several hundreds of fuel cells 10.

Figure 19:
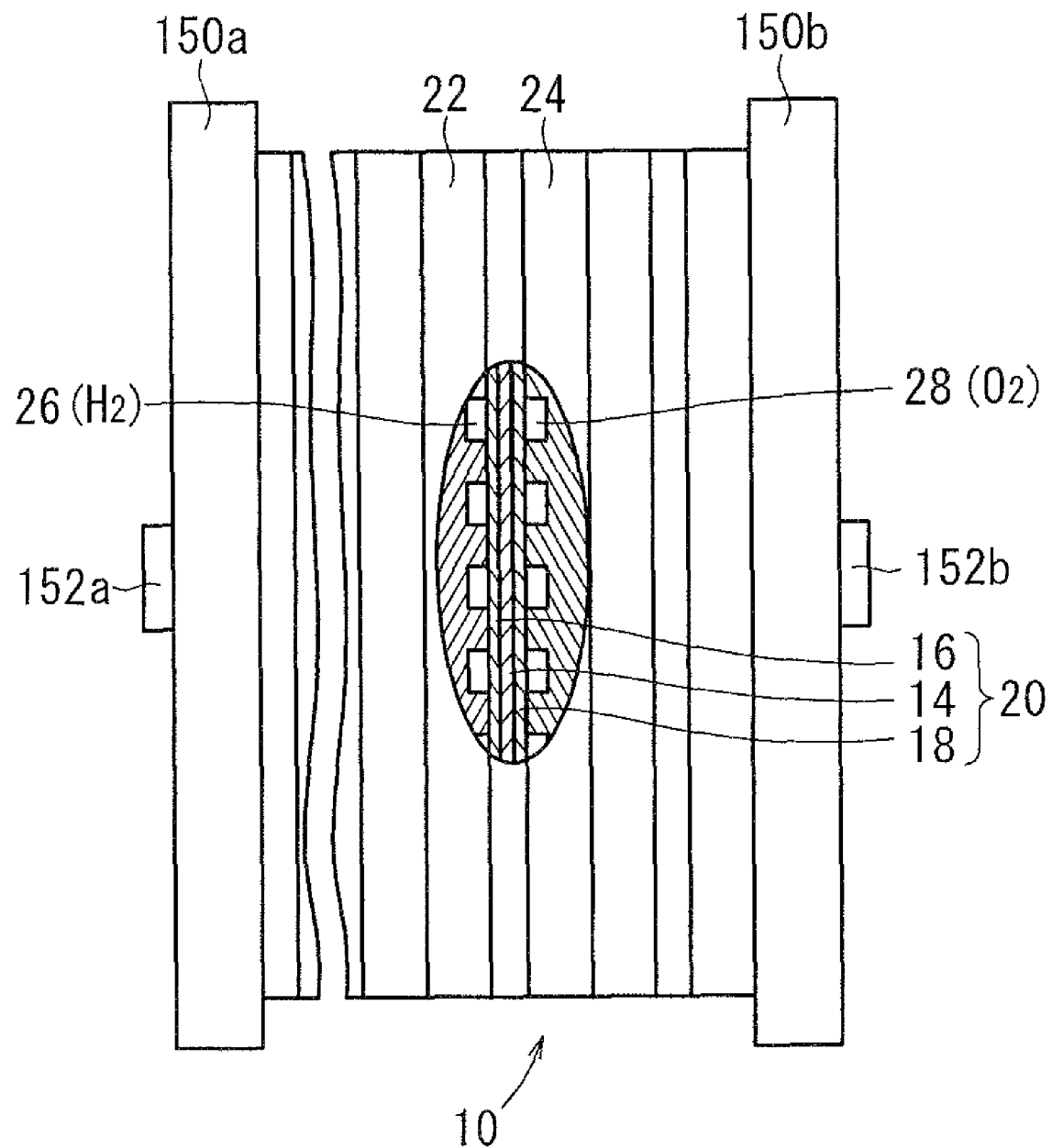
FIG. 19 is a cross sectional view showing the fuel cell.

As shown in FIGS. 18 and 19, end plates 150a, 150b are provided at opposite ends of the fuel cells 10 in the stacking direction. Though not shown, for example, components between the end plates 150a, 150b are tightened together by hydraulic pressure, by bolts, or by placing the components in a box. An anode terminal 152a protrudes outwardly from the end plate 150a, and a cathode terminal 152b protrudes outwardly from the end plate 150b.

The power supply unit 146 electrically connects the fuel cell stacks, from the fuel cell stack 142a on the upstream side to the fuel cell stack 142c on the downstream side in series. Specifically, as shown in FIG. 18, the power supply unit 146 includes a direct current power supply 154. The plus electrode of the direct current power supply 154 is electrically connected to the anode terminal 152a of the fuel cell stack 142a positioned at the upstream end through a cable 156a. The minus electrode of the direct current power supply 154 is electrically connected to the cathode terminal 152b of the fuel cell stack 142c at the downstream end through a cable 156b. It is preferable that the fuel cell stacks 142a to 142c have the same structure so that the current density at the electrode becomes the same in each of the fuel cell stacks 142a to 142c when these stacks are connected in series.

The cathode terminal 152b of the fuel cell stack 142a is electrically connected to the anode terminal 152a of the fuel cell stack 142b by a connection cable 158a. The cathode terminal 152b of the fuel cell stack 142b is electrically connected to the anode terminal 152a of the fuel cell stack 142c by a connection cable 158b. The direct current power supply 154 is controlled by a controller 160. The controller 160 implements the overall control of the aging apparatus 140.

The hydrogen supply unit 148 includes an anode supply pipe 164, and a humidifier 162 is provided in the anode supply pipe 164. The anode supply pipe 164 is connected to the fuel gas supply passage 30a of the fuel cell stack 142a. One end of a serial supply channel 166a is connected to the oxygen-containing gas discharge passage 32b of the fuel cell stack 142a, and the other end of the serial supply channel 166a is connected to the fuel gas supply passage 30a of the fuel cell stack 142b. Similarly, one end of a serial supply channel 166b is connected to the oxygen-containing gas discharge passage 32b of the fuel cell stack 142b, and the other end of the serial supply channel 166b is connected to the fuel gas supply passage 30a of the fuel cell stack 142c. A discharge pipe 168 is connected to the oxygen-containing gas discharge passage 32b of the fuel cell stack 142c.

An operating method by the aging apparatus 140 will be described below.

Firstly, as shown in FIG. 18, the fuel cell stacks 142a to 142c are placed in the stack area 144. The fuel cell stacks 142a to 142c are electrically connected to the power supply unit 146 in series, and connected to the hydrogen supply unit 148 in series.

Then, the power supply unit 146 applies the plus electrode electric potential to the anode terminals 152a (anodes 16) of the fuel cell stacks 142a to 142c, and the minus electrode electric potential to the cathode terminals 152b (cathodes 18) of the fuel cell stacks 142a to 142c.

In this state, the hydrogen supply unit 148 supplies the hydrogen gas to the anode supply pipe 164. The hydrogen gas is humidified by the humidifier 162, and then, the humidified hydrogen is supplied to the fuel gas supply passage 30a of the fuel cell stack 142a on the upstream side. The hydrogen gas is supplied to the fuel gas flow field 26 of each fuel cell 10.

Thus, protons (hydrogen ions) from the anode 16 move to the cathode 18, and entrained water is supplied to the solid polymer electrolyte membrane 14. As a result, the water content ratio of the solid polymer electrolyte membrane 14 is increased. In this manner, the aging process by the hydrogen pump operation is performed in the fuel cell stack 142a.

The hydrogen gas in the oxygen-containing gas flow field 28 of the fuel cell 10 is discharged from the oxygen-containing gas flow field 28 to the oxygen-containing gas discharge passage 32b. The hydrogen is supplied from the serial supply channel 166a connected to the oxygen-containing gas discharge passage 32b of the fuel cell stack 142a, to the fuel gas supply passage 30a of the fuel cell stack 142b positioned downstream of the fuel cell stack 142a.

Accordingly, in the fuel cell stack 142b, the hydrogen gas is supplied to the fuel gas flow field 26 of the fuel cell 10, and the hydrogen ions pass through the solid polymer electrolyte membrane 14. As a result, the hydrogen gas is obtained at the cathode 18. In this manner, the aging process by the hydrogen pump operation is performed in the fuel cell stack 142b.

The hydrogen gas discharged from the oxygen-containing gas discharge passage 32b of the fuel cell stack 142b flows into the fuel gas supply passage 30a of the fuel cell stack 142c. Thus, in the fuel cell stack 142c, in the same manner as in the cases of the fuel cell stacks 142a, 142b, the aging process by the hydrogen pump operation is performed.

In the hydrogen supply unit 148, the anode supply pipe 164 is connected to the fuel gas supply passage 30a of the fuel cell stack 142a. The oxygen-containing gas discharge passage 32b of the fuel cell stack 142a is connected to the fuel gas supply passage 30a of the fuel cell stack 142b by the serial supply channel 166a. The oxygen-containing gas discharge passage 32b of the fuel cell stack 142b is connected to the fuel gas supply passage 30a of the fuel cell stack 142c by the serial supply channel 166b.

Therefore, the hydrogen discharged from the cathode of the fuel cell stack 142a on the upstream side is supplied to the anode of the fuel cell stack 142b on the downstream side, and the hydrogen discharged from the cathode of the fuel cell stack 142b is supplied to the anode of the fuel cell stack 142c on the downstream side. In this manner, the hydrogen is used efficiently, and the amount of the hydrogen supplied from the outside is reduced suitably, and economically.

Further, in the power supply unit 146, the plus electrode of the direct current power supply 154 is electrically connected to the anode terminal 152a of the fuel cell stack 142a at the upstream end, and the minus electrode of the direct current power supply 154 is electrically connected to the cathode terminal 152b of the fuel cell stack 142c at the downstream end.

Further, the cathode terminal 152b of the fuel cell stack 142a and the anode terminal 152a of the fuel cell stack 142b are electrically connected by the connection cable 158a, and the cathode terminal 152b of the fuel cell stack 142b and the anode terminal 152a of the fuel cell stack 142c are electrically connected by the connection cable 158b.

In the structure, the fuel cell stacks 142a to 142c are electrically connected in series to the direct current power supply 154. Accordingly, using the single direct current power supply 154, the aging process by the hydrogen pump operation is performed for a plurality of, e.g., the three fuel cell stacks 142a to 142c at the same time.

Figure 20:
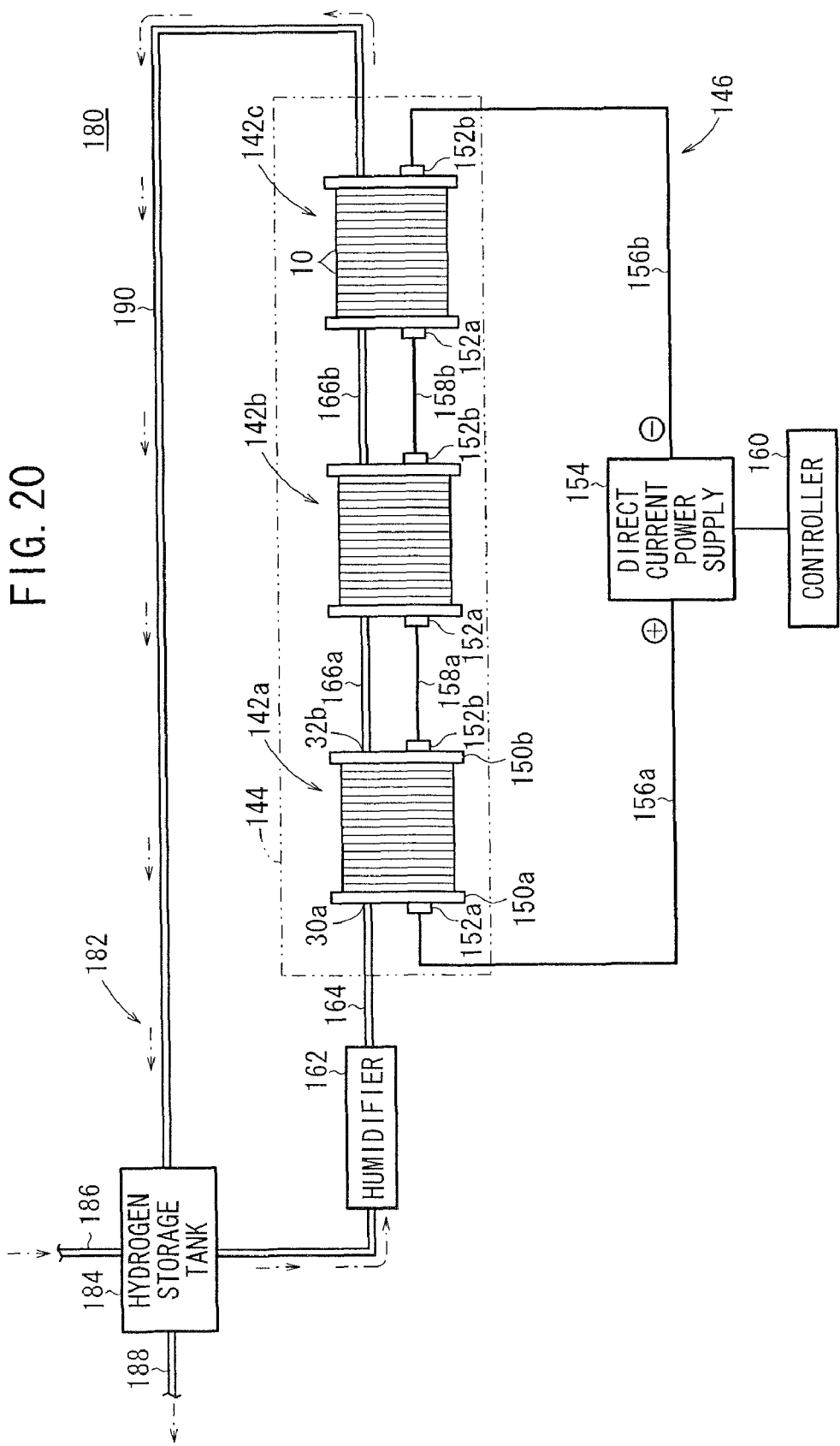
FIG. 20 is a diagram schematically showing structure of an aging apparatus according to a sixth embodiment of the present invention.

FIG. 20 is a diagram schematically showing structure of an aging apparatus 180 according to a sixth embodiment of the present invention. The constituent elements of the aging apparatus 180 that are identical to those of the aging apparatus 140 according to the fifth embodiment are labeled with the same reference numerals, and detailed descriptions thereof are omitted. Further, in a seventh embodiment as described later, the constituent elements that are identical to those of the aging apparatus 140 according to the fifth embodiment are labeled with the same reference numerals, and detailed descriptions thereof are omitted.

The aging apparatus 180 includes a hydrogen supply unit 182. A hydrogen storage tank 184 is provided upstream of an anode supply pipe 164 of the hydrogen supply unit 182. At the hydrogen storage tank 184, a hydrogen inlet pipe 186 connected to a hydrogen supply source (not shown), a distribution pipe 188 for distributing the hydrogen gas to another aging apparatus, and a circulation channel 190 for returning the hydrogen gas discharged from the oxygen-containing gas discharge passage 32b of the fuel cell stack 142c at the downstream end, to the hydrogen storage tank 184 are provided.

In the sixth embodiment, the hydrogen gas discharged from the fuel cell stack 142c at the downstream end is temporarily returned to the hydrogen storage tank 184 through the circulation channel 190, and then, the hydrogen gas is supplied to the anode supply pipe 164. In this manner, hydrogen is recycled. Accordingly, further reduction is achieved in the amount of hydrogen consumption. With the reduced hydrogen amount, it is possible to perform the aging process by the hydrogen pump operation.

In practice, the entire fuel cell stack (full stack) can be divided into three small blocks, i.e., the fuel cell stacks 142a to 142c. Therefore, the aging process for the fuel cell stacks 142a to 142c before stacked into the full stack can be performed by batch processing.

Figure 21:
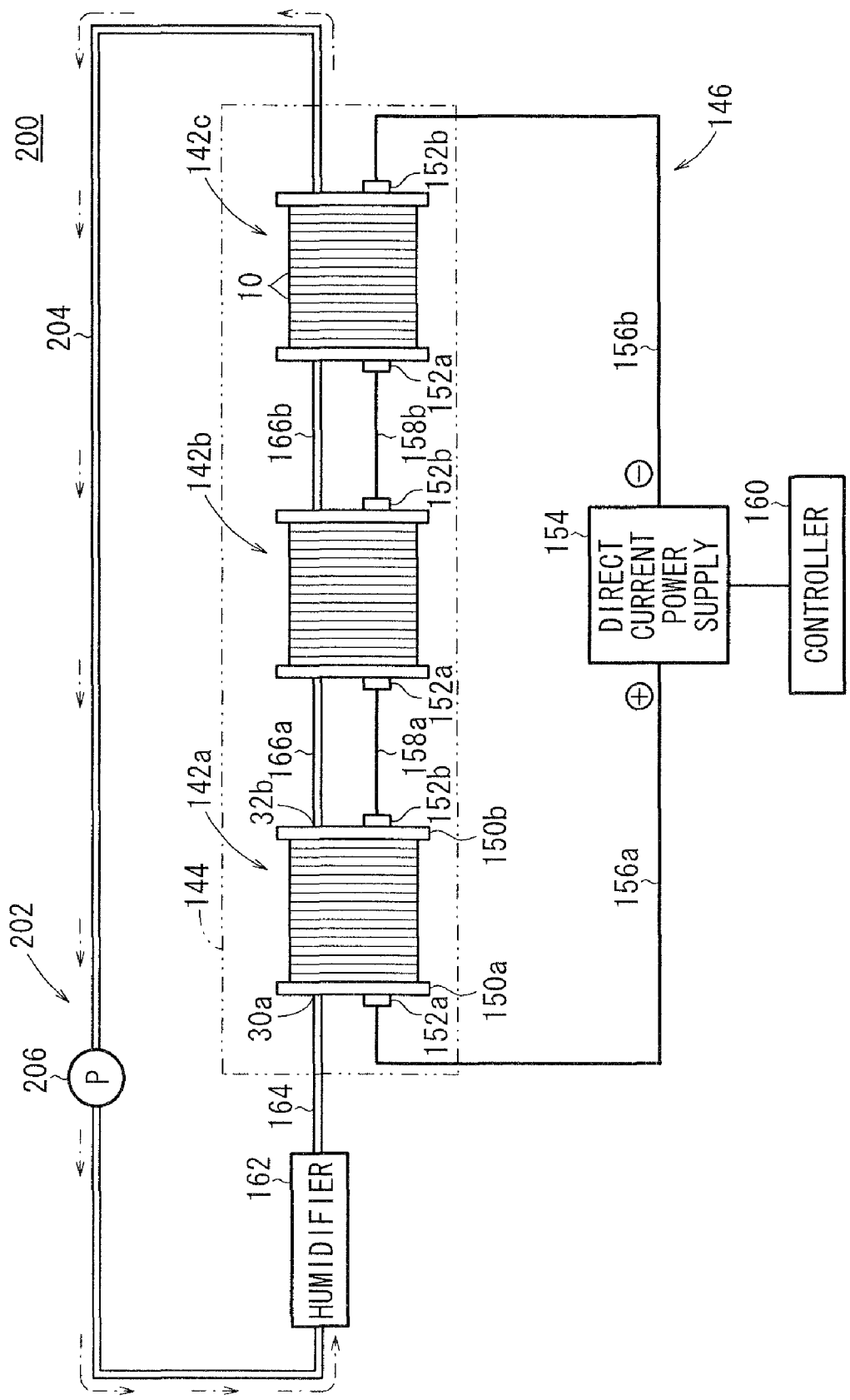
FIG. 21 is a diagram schematically showing structure of an aging apparatus according to a seventh embodiment of the present invention.

FIG. 21 is a diagram schematically showing an aging apparatus 200 according to the seventh embodiment of the present invention.

The aging apparatus 200 includes a hydrogen supply unit 202 having a circulation channel 204. One end of the circulation channel 204 is connected to the oxygen-containing gas discharge passage 32b of the fuel cell stack 142c at the downstream end, and the other end of the circulation channel 204 is connected to the anode supply pipe 164. A pump 206 is provided in the circulation channel 204 for circulating the hydrogen.

In the seventh embodiment, the hydrogen gas discharged from the oxygen-containing gas discharge passage 32b of the fuel cell stack 142c at the downstream end is returned from the circulation channel 204 to the anode supply pipe 164 by operation of the pump 206, and utilized again.

In the structure, the same advantages as in the cases of the fifth and sixth embodiments are obtained. For example, reduction in the amount of hydrogen gas consumption is reduced effectively, and the aging process is performed economically by the hydrogen pump operation.

While the invention has been particularly shown and described with reference to preferred embodiments, it will be understood that variations and modifications can be effected thereto by those skilled in the art without departing from the spirit of the invention as defined by the appended claims.

What is claimed is:

1. A method of operating a newly assembled solid polymer electrolyte fuel cell for aging of the solid polymer electrolyte fuel cell, the solid polymer electrolyte fuel cell including a membrane electrode assembly comprising a pair of electrodes and an electrolyte membrane interposed between the electrodes, the method comprising:

a first aging step of performing a hydrogen pump operation in a state where an electric potential is applied to the solid polymer electrolyte fuel cell, by not supplying an oxygen-containing gas to one of the electrodes and by supplying humidified hydrogen to the other of the electrodes to cause the hydrogen to pass through the electrolyte membrane toward the one electrode, wherein a minus electrode electric potential is applied to a cathode as the one electrode, and a plus electrode electric potential is applied to an anode as the other electrode; and a second aging step of performing power generation of the solid polymer electrolyte fuel cell at least at the maximum current density after the first aging step.

2. An operating method according to claim 1, wherein the electrolyte membrane includes hydrocarbon material.

3. A method of operating a newly assembled solid polymer electrolyte fuel cell for aging of the solid polymer electrolyte fuel cell, the solid polymer electrolyte fuel cell including a membrane electrode assembly comprising a pair of electrodes and an electrolyte membrane interposed between the electrodes, the method comprising the steps of:

directly supplying water in the liquid state to the membrane electrode assembly; and an aging step of performing a hydrogen pump operation in a state where an electric potential is applied to the solid polymer electrolyte fuel cell, by not supplying an oxygen-containing gas to one of the electrodes and by supplying humidified hydrogen to the other of the electrodes to cause the hydrogen to pass through the electrolyte membrane toward the one electrode, wherein a minus electrode electric potential is applied to a cathode as the one electrode, and a plus electrode electric potential is applied to an anode as the other electrode.

4. An operating method according to claim 3, wherein the solid polymer electrolyte fuel cell has a fuel gas flow field for supplying a fuel gas to the other electrode, and an oxygen-containing gas flow field for supplying an oxygen-containing gas to the one electrode; and heat retention of the solid polymer electrolyte fuel cell is performed in a state where at least the fuel gas flow field or the oxygen-containing gas flow field is filled with the water in the liquid state.

5. An operating method according to claim 3, further comprising the step of performing power generation of the solid polymer electrolyte fuel cell at least at maximum current density in use after the hydrogen pump operation is performed at least at the maximum current density in use.

6. An operating method according to claim 3, wherein the electrolyte membrane includes hydrocarbon material.

7. An operating method according to claim 3, wherein the water in the liquid state is hot pure water having a temperature in a range of 40° C. to 100° C.

8. A method of operating a newly assembled solid polymer electrolyte fuel cell for aging of the solid polymer electrolyte fuel cell, the solid polymer electrolyte fuel cell including a membrane electrode assembly comprising a pair of electrodes and an electrolyte membrane interposed between the electrodes, the method comprising:

an aging step of performing a hydrogen pump operation in a state where an electric potential is applied to the solid polymer electrolyte fuel cell, by not supplying an oxygen-containing gas to one of the electrodes and by supplying humidified hydrogen to the other of the electrodes to cause the hydrogen to pass through the electrolyte membrane toward the one electrode, wherein in the aging step, a minus electrode electric potential is applied to a cathode as the one electrode, and a plus electrode electric potential is applied to an anode as the other electrode and hydrogen discharged from at least the one electrode is returned to the other electrode.

9. An operating method according to claim 8, further comprising the step of reducing a pressure in a channel for the hydrogen at least before or after the aging step.

10. An operating method according to claim 8, wherein after the hydrogen passes through a humidifier, the hydrogen humidified by the humidifier is supplied to the other electrode.

11. An operating method according to claim 8, further comprising the step of performing power generation of the solid polymer electrolyte fuel cell at least at maximum current density in use after the hydrogen pump operation is performed at least at the maximum current density in use.

12. An operating method according to claim 8, wherein the electrolyte membrane includes hydrocarbon material.

13. A method of operating a newly assembled solid polymer electrolyte fuel cell for aging of the solid polymer electrolyte fuel cell, the solid polymer electrolyte fuel cell including a membrane electrode assembly comprising a pair of electrodes and an electrolyte membrane interposed between the electrodes, the method comprising:

a positioning step of preparing and positioning a plurality of fuel cell stacks each including at least one newly assembled solid polymer electrolyte fuel cell; and an aging step of performing a hydrogen pump operation in a state where an electric potential is applied to the fuel cell stacks, by not supplying an oxygen-containing gas to one of the electrodes and by supplying humidified hydrogen to the other of the electrodes, wherein a minus electrode electric potential is applied to a cathode as the one electrode, and a plus electrode electric potential is applied to an anode as the other electrode, and wherein in the aging step, after the hydrogen supplied to the other electrode of the fuel cell stack on an upstream side passes through the electrolyte membrane toward the one electrode, the hydrogen is supplied to the other electrode of the fuel cell stack on a downstream side.

14. An operating method according to claim 13, wherein the hydrogen discharged from the one electrode of the fuel cell stack at the downstream end is returned to the other electrode of the fuel cell stack at the upstream end through a circulation channel.

15. An operating method according to claim 14, wherein a storage tank for storing the hydrogen is provided in the circulation channel.

16. An operating method according to claim 13, wherein after the hydrogen is humidified by a humidifier, the hydrogen is supplied to the fuel cell stack at the upstream end.

17. An operating method according to claim 13, wherein the fuel cell stack on the upstream side is electrically connected to the fuel cell stack on the downstream side in series.

18. An operating method according to claim 13, wherein the electrolyte membrane includes hydrocarbon material.

* * * * *